(12) United States Patent
Hecht et al.

(10) Patent No.: US 9,411,969 B2
(45) Date of Patent: *Aug. 9, 2016

(54) SYSTEM AND METHOD OF ASSESSING DATA PROTECTION STATUS OF DATA PROTECTION RESOURCES

(71) Applicant: CONTINUITY SOFTWARE LTD., Hertzlia (IL)

(72) Inventors: Gil Hecht, Moshav Nir Israel (IL); Doron Pinhas, Shoham (IL); Doron Gordon, Kadima (IL)

(73) Assignee: CONTINUITY SOFTWARE LTD., Hertzlia (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/490,043

(22) Filed: Sep. 18, 2014

(65) Prior Publication Data

US 2015/0007261 A1 Jan. 1, 2015

Related U.S. Application Data

(63) Continuation-in-part of application No. 12/125,564, filed on May 22, 2008, now Pat. No. 8,863,224, which is a continuation of application No. PCT/IL2006/001353, filed on Nov. 23, 2006.

(60) Provisional application No. 60/739,416, filed on Nov. 25, 2005.

(51) Int. Cl.
*H04L 29/06* (2006.01)
*G06F 21/60* (2013.01)

(52) U.S. Cl.
CPC ........ *G06F 21/604* (2013.01); *G06F 2221/034* (2013.01); *G06F 2221/2101* (2013.01)

(58) Field of Classification Search
CPC ...................................................... G06F 21/60
See application file for complete search history.

(56) References Cited

U.S. PATENT DOCUMENTS

| 7,702,667 B2 * | 4/2010 | Yahalom et al. | 707/611 |
| 2003/0225801 A1 * | 12/2003 | Devarakonda et al. | 707/205 |
| 2007/0011105 A1 * | 1/2007 | Benson et al. | 706/1 |
| 2007/0016542 A1 * | 1/2007 | Rosauer et al. | 706/21 |

OTHER PUBLICATIONS

Strunk, John D., et al. "Self-securing storage: protecting data in compromised system." Proceedings of the 4th conference on Symposium on Operating System Design & Implementation—vol. 4. USENIX Association, 2000.*

* cited by examiner

*Primary Examiner* — Shawnchoy Rahman
(74) *Attorney, Agent, or Firm* — Oliff PLC

(57) ABSTRACT

There are provided a method, system and service for computerized managing a plurality of data protection (DP) resources. The method comprises: accommodating data related to at least part of the DP resources among said plurality of DP resources in a memory thus giving rise to accommodated data, wherein at least part of the accommodated data is obtained by automated collecting; processing by a processor operatively coupled to the memory the accommodated data, said processing resulting in identifying at least one data protection (DP) scheme characterized, at least, by a data protection technique implemented with regard to at least one DP resource related to said DP scheme; identifying by the processor one or more data protection (DP) gaps affected the at least one DP resource; and using the identified one or more DP gaps for assessing, by the processor, DP risk score to the at least one DP resource.

17 Claims, 9 Drawing Sheets

SYSTEM AND METHOD OF ASSESSING DATA PROTECTION STATUS OF DATA PROTECTION RESOURCES

CROSS-REFERENCES TO RELATED APPLICATIONS

The present application is continuation-in-part of U.S. patent application Ser. No. 12/125,564 filed on May 22, 2008, which is a continuation of International Patent Application No. PCT/IL2006/001353 filed Nov. 23, 2006, which claims priority to U.S. Provisional Application No. 60/739,416 filed on Nov. 25, 2005. The entire contents of all applications are incorporated herein by reference.

FIELD OF THE INVENTION

This invention relates to a field of data protection (including service resiliency) and, in particular, to systems and methods of managing data protecting resources.

BACKGROUND OF THE INVENTION

Large enterprises are investing significant resources to maintain valid and functional data protection (DP) solutions in place. Data protection can entail various approaches and methodologies, including backup, archiving, disaster recovery, high availability, business continuity, application server clusters, load-balancing, virtualization and other service resiliency protecting resources in accordance with an enterprise's business protection requirements and the budget available. Users are looking for a solution that will help to verify that critical data, compute, communication and application elements are protected, and DP configuration can provide a reliable and safe switch to redundant computing resources in case of an unexpected disaster or service disruption.

The problem was recognized in the Prior Art and various systems were developed to provide a solution, for example:

US Patent Application No. 2004/64,436 (Breslin, Jodi et al.) published Apr. 1, 2004 and entitled "System and method for managing business continuity" discloses a system and method for developing, assessing testing and implementing plans and procedures for managing crisis events and providing continuity to business operations in cases of business interruption. Such business interruption can occur due to a variety of reasons including physical facility emergency. The continuity in business operations relates at least to real estate, and critical business resources such as computers, databases and applications. The system includes a core repository that manages, monitors and measures all core continuity processes across an institution (e.g., a corporation). Once an emergency has been identified, the system links the continuity plans to crisis team initiatives across the corporation. The system provides an executive level 'state of health' reporting facility to enable executives (managers) to assess the state of the business and the execution of the continuity plans in real time.

US Patent Application No. 2004/153,708 (Joshi, Darshan B. et al.) published Aug. 5, 2004 and entitled "Business continuation policy for server consolidation environment" discloses a method, computer program product and system that establishes and maintains a business continuity policy in a server consolidation environment. Business continuity is ensured by enabling a high availability of applications. When an application is started, restarted upon failure, or moved due to an overload situation, a system is selected best fulfilling the requirements for running the application. These requirements can include application requirements, such as an amount of available capacity to handle the load that will be placed on the system by the application. These requirements can further include system requirements, such as honoring a system limit of a number of applications that can be run on a particular system. Respective priorities of applications can be used to determine whether a lower-priority application can be moved to free resources for running a higher-priority application.

US Patent Application No. 2004/221,049 (Blumenau, Steve, et al.) published Nov. 4, 2004 and entitled "Method and apparatus for identifying network devices on a storage network" discloses a method and apparatus for managing the availability and assignment of data in a storage system that is coupled to a network. A user interface is provided that executes on a host processor that is coupled to the storage system over the network. The user interface communicates with a configuration database in the storage system to identify host processors that are logged into the storage system over the network, to identify storage volumes on the storage system, to identify whether access to a particular storage volume on the storage system is permitted from a particular host processor, and to identify a network path by which host processors are logged into the storage system over the network. In one embodiment, a graphical user interface is provided that can be used to graphically represent host processors, host bus adapters, storage systems, and storage system adapters and storage volumes on the storage system. The graphical representation provided by the graphical user interface permits a user to graphically view a topology of the network at varying levels of detail, selectable by the user. The graphical user interface also permits a user to allow or deny access to storage systems or a particular storage volume on storage system from one or more of the host processors, host bus adapters, etc., by selecting and manipulating graphical representations thereof.

US Patent Application No. 2004/243,699 (Kocklanes Mike; et al.) published Dec. 2, 2004 and entitled "Policy based management of stored resources" discloses a system and method of policy based management wherein service level objectives are associated with storage resource requestors such as applications. A set of policy rules is established in connection with these service level objectives. An update of the configuration of the storage network, such as a provisioning of storage resources for the application, is performed according to a workflow that implements the policy rules, which allows the service level objectives of the application to be automatically satisfied by the new provisioning. Metrics are used to ensure that service level objectives continue to be met.

US Patent Application No. 2005/144,062 (Mittal, Manish M.; et al.) published Jun. 30, 2005 and entitled "Business continuity information management system" discloses a system for implementing a corporate business continuity plan in which a plurality of governance rules are maintained and updated for one or more business locations. The governance rules establish business continuity responsibilities that are, in turn, assigned to designated employees for periodic or occasional action. Each designated employee is responsible for performing their assigned business continuity responsibilities and submitting statuses of such responsibilities to the system according to established timelines. One or more business continuity readiness indicators are then generated, based on the submitted statuses.

US Patent Application 2006/74,993 (Mulpuri Rajasekhar et al.) published Jun. 4, 2006 and entitled "System and method for management of recovery time objectives of business continuity/disaster recovery IT solutions" discloses a system and method for management of Recovery Time Objective (RTO) of a business continuity or disaster recovery solution. The system comprises a management server logically coupled with at least a first computer, at least a second computer, and a network coupling the first and the second computers. The first and second computers host at least one continuously available application, at least one data protection scheme for replicating the application data and at least one operating system; the application data being periodically replicated from the first computer to at least the second computer. The system manages RTO by inputting an RTO value for the solution, calculating a real time RTO value for the solution, and making the real time RTO value less than or equal to the input RTO value.

US Patent Application No. 2007/088763 discloses systems and processes for determining and validating accessibility and currency, i.e., the actual status, of data replicated in a networked environment are disclosed. According to the disclosed process, a replicated-data policy for replicating data is defined, and access paths between network devices or between applications running on the network devices are monitored, for example, by a replicated-data monitor. Also monitored are the data replication activities in the network. The currency, i.e., timeliness, and accessibility of a replica by a network device is then compared with the requirements in the replicated-data policy and discrepancies with the replicated-data policy are identified, optionally accompanied by a notification.

European Patent Application 1,526,679 (Leberre, Philippe) published Apr. 27, 2005 and entitled "Methods relating to the monitoring of computer systems" discloses a method of monitoring the condition of a computer system, comprising receiving performance data from the system, processing the data to estimate the likelihood of a deterioration in the condition of the system and providing an output which is dependent upon the estimated likelihood.

SUMMARY OF THE INVENTION

In accordance with certain aspects of the presently disclosed subject matter, there is provided a method of computerized managing a plurality of data protection (DP) resources. The method comprises: accommodating data related to at least part of the DP resources among said plurality of DP resources in a memory thus giving rise to accommodated data, wherein at least part of the accommodated data is obtained by automated collecting; processing by a processor operatively coupled to the memory the accommodated data, said processing resulting in identifying at least one data protection (DP) scheme characterized, at least, by a data protection technique implemented with regard to at least one DP resource related to said DP scheme; identifying by the processor one or more data protection (DP) gaps affected the at least one DP resource; and using the identified one or more DP gaps for assessing, by the processor, DP risk score to the at least one DP resource.

Identifying the one or more DP gaps can comprise running at least one rule being characterized by a scope of the rule, an identification condition and an action to be drawn from the rule when the condition is satisfied, wherein the scope of the rule is characterized by said identified DP scheme. DP gap can be characterized by a gap profile and can be identified by matching said gap profile to a respective DP scheme. Gap profile can be specified as a combination of the DP scheme and condition characterizing one or more predefined DP violations.

In accordance with further aspects of the presently disclosed subject matter, assessing DP risk score to the at least one DP resource can comprise calculating the risk score as a function of, at least, the identified one or more DP gaps, respective DP gaps severities and a state of the at least one DP resource.

One or more DP risk scores assessed to the at least one DP resource can be accommodated in the memory, each DP risk score associated with a corresponding time stamp indicative of point in time of assessing the respective risk score.

In accordance with further aspects of the presently disclosed subject matter, the method can further comprise generating one or more reports rendering, at least, data indicative of differences between DP risk scores assessed to the at least one DP resource and having different time stamps.

In accordance with further aspects of the presently disclosed subject matter, assessing DP risk scores can be provided responsive to at least one change in the data protection technique implemented with regard to the at least one DP resource. The generated report can render the provided at least one change in conjunction with DP risk score associated with a time stamp corresponding to the time of the at least one change.

In accordance with other aspects of the presently disclosed subject matter, there is provided a system capable of computerized managing a plurality of data protection (DP) resources. The system comprises: a processor operatively coupled to a memory adapted to accommodate data related to at least part of the DP resources among said plurality of DP resources, wherein at least part of accommodated data is obtained by automated collecting and/or automated processing of the collected data, thus giving rise to accommodated data. The processor is configured to process the accommodated data, said processing to be resulted in identifying at least one data protection (DP) scheme characterized, at least, by a data protection technique implemented with regard to at least one DP resource related to said DP scheme and in identifying one or more data protection (DP) gaps affected the at least one DP resource; the processor is further configured to use the identified one or more DP gaps for assessing DP risk score to the at least one DP resource.

The system can further comprise a report generator configured to generate one or more reports rendering, at least, data indicative of differences between DP risk scores assessed to the at least one DP resource and having different time stamps.

The processor can be further configured to assess DP risk score responsive to at least one change in the data protection technique implemented with regard to the at least one DP resource, and the report generator can be configured to generate one or more reports rendering the provided at least one change in conjunction with DP risk score associated with a time stamp corresponding to the point in time of the at least one change.

In accordance with other aspects of the presently disclosed subject matter, there is provided a computerized method of providing a service related to identifying one or more data protection (DP) gaps related to one or more DP resources among a plurality of data protection (DP) resources. The service comprises: accommodating data related to at least part of the DP resources among said plurality of DP resources in a memory thus giving rise to accommodated data, wherein at least part of the accommodated data is obtained by automated collecting; processing by a processor operatively coupled to the memory the accommodated data, said processing resulting in identifying at least one data protection (DP) scheme characterized, at least, by a data protection technique implemented with regard to at least one DP resource related to said DP scheme; identifying by the processor one or more data protection (DP) gaps affected the at least one DP resource; and using the identified one or more DP gaps for assessing, by the processor, DP risk score to the at least one DP resource.

Among advantages of certain aspects of the presently disclosed subject matter is enabling tools for monitoring the health and Service Level (SLA) of implemented DP solutions (e.g. goals governing required recovery time, desired maximum amount of information that can be lost, performance requirements, capacity requirements, location requirements, software standards, etc.); enabling tools for planning, diagnostics, cost analysis, what-if analysis and regulation compliance verification. The presently disclosed subject matter can facilitate automated mapping of DP resources and dependencies between such resources in a manner supporting a technology in use; tracking changes in the DP deployment; automated analyzing the DP environment to detect DP implementation gaps, bad practices and SLA breaches; automated problem resolution; automated fail-over and fail-back procedures.

Among further advantages of certain aspects of the presently disclosed subject matter is providing the capability to assess DP risk status of DP solutions in different points in time and over time. This capability could be useful for many use-cases, including the ability to understand the impact of provided changes on reliability and availability of DP resources, and to obtain actionable information.

In certain embodiments of the presently disclosed subject matter the violation identified by the automated analyses can be followed by root cause analyses and respective recommendations. For example the automated analysis can verify that:
there are no DP resources, such as, for example, storage volumes, which fail to be protected (for example, replicated and mapped to a designated target host);
volumes are protected in a time-synchronized way;
no data is accidentally copied to the wrong place;
no process at the recovery site is tampering with the copies;
versions of the OS and database software at source and target hosts are identical;
hardware is compatible between related systems;
underlying mechanisms are functioning properly;
replication is performed at a frequency and with enough historical data retention so as to satisfy corporate SLAs; and other aspects related to data protection, data availability and service resiliency;
High availability configurations are configured correctly (for example, that storage configuration, network configuration, service group configuration, etc. are correctly implemented and do not represent risk to data and service availability);
Virtualization and Cloud Computing components are configured correctly (for example, the virtual infrastructure configuration does not represent risks to date protection and service availability, the virtual components—such as Virtual Machines, Virtual Networks. Virtual Applications and other containers are not configured in a way that represents risk to data protection and service availability);
Application infrastructure is configured correctly (for example, application servers and load-balancers are not configured in a way compromising data protection and service resiliency).

BRIEF DESCRIPTION OF THE DRAWINGS

In order to understand the invention and to see how it can be carried out in practice, an embodiment will now be described, by way of non-limiting example only, with reference to the accompanying drawings, in which.

DETAILED DESCRIPTION OF EXEMPLARY EMBODIMENTS

Figure 1:
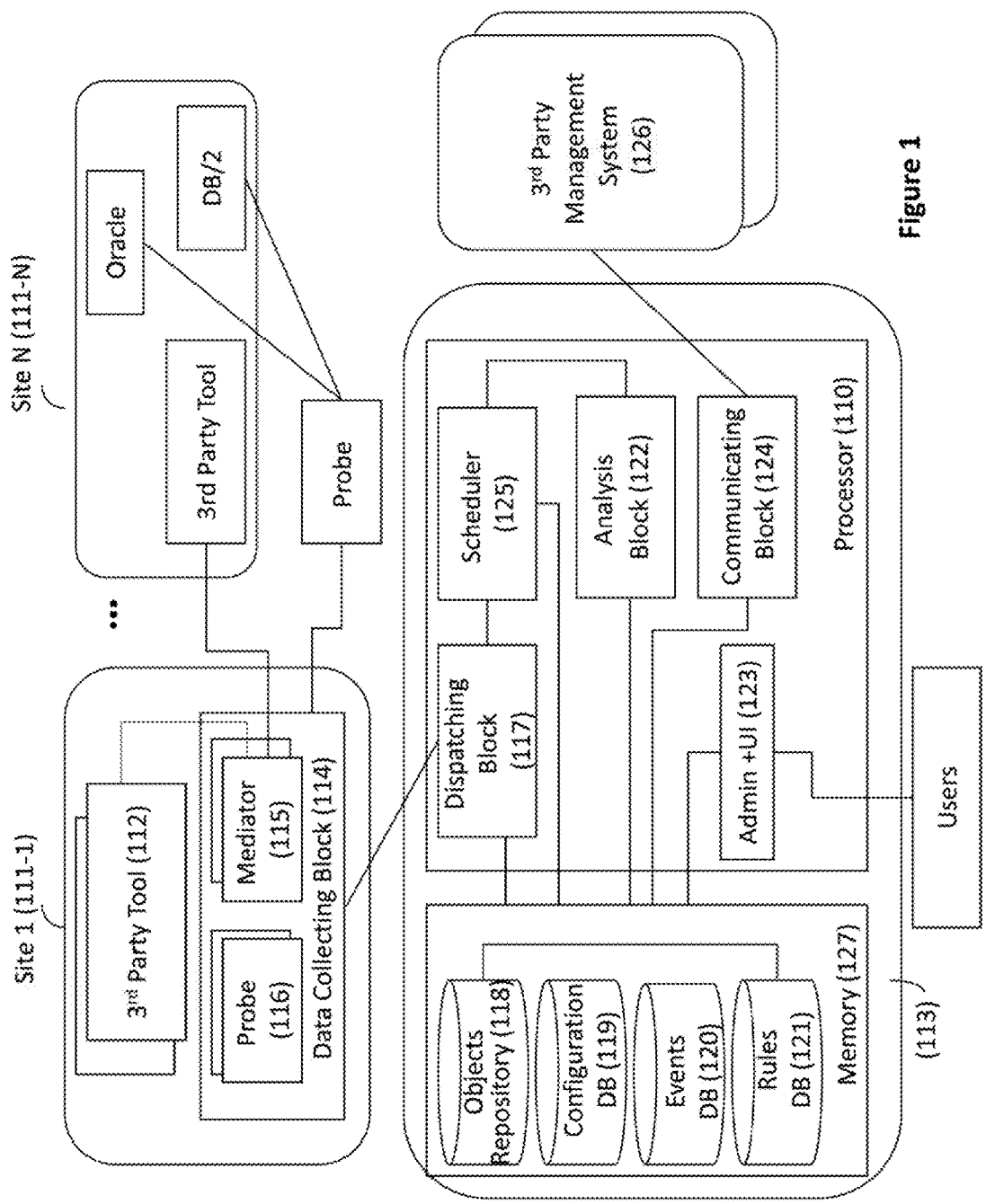
FIG. 1 illustrates a generalized high-level block diagram of a system for managing DP resources in accordance with certain embodiments of the presently disclosed subject matter.

In the following detailed description, numerous specific details are set forth in order to provide a thorough understanding of the invention. However, it will be understood by those skilled in the art, that the presently disclosed subject matter can be practiced without these specific details. In other instances, well-known methods, procedures, components and circuits have not been described in detail so as not to obscure the presently disclosed subject matter. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "assessing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, a DP system disclosed in the present application.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages can be used to implement the teachings of the presently disclosed subject matter as described herein.

The term "condition" used in this patent specification should be expansively construed to include any compound conditions, including, for example, several conditions and/or their logical combinations.

The term "criterion" used in this patent specification should be expansively construed to include any compound criterion, including, for example, several criteria and/or their logical combinations.

The term "data protection (DP) scheme" used in this patent specification should be expansively construed to include any given combination of one or more data protection (DP) resources, the combination characterized, at least, by relationships between DP resources and/or properties of the resource(s) in conjunction with one or more data protection techniques implemented with relation to the given combination of DP resources.

Unless specifically stated otherwise, it is appreciated that throughout the specification the term "data protection technique" should be expansively construed to include any appropriate technique involved in disaster recovery and/or business continuity design including protection of data, service resiliency techniques, etc. Non-limiting examples of data protection techniques include data replication techniques based on one or more of tape and/or disk backup; block level, file level, object level and/or point in time replications; archive logs, clustering, load balancing, virtualization, etc.

The term "data protection (DP) gap" used in this patent specification should be expansively construed to characterize a discrepancy between a given DP scheme and a desired state of this given DP scheme (e.g. in accordance with best practice, benchmarking, knowledge database, or other desired state formulated in explicit or implicit manner.). DP gap can be characterized by a gap profile specified as a combination of a respective DP scheme and a condition indicative of one or more predefined DP violations in this DP scheme. The DP gap can be characterized by severity, type of impact on DP scheme and resources therein, and/or otherwise. Non-limiting examples of DP gaps include data inconsistency between source and target systems; incomplete data between source and target systems; inappropriate software and/or hardware configuration between related systems (such as source and target systems, HA cluster nodes, servers that collectively support an application, databases in the same database grid, etc.); SLA breaches; data accessibility and/or data path problems; data tampering; general best practice violations; wasting of DP resources, lack of redundancy, incorrect alignment between different IT layers (such as virtual machines and virtual infrastructure, servers and storage, and other), etc.

The term "data protection (DP) resource" used in this patent specification should be expansively construed to include any physical objects, logical objects, groups of physical and/or logical objects and combination thereof involved in data protection (including service resiliency). The physical objects include objects of computing, storage and network infrastructure as, for example, servers, application servers, storage devices, disks, switches, load-balancers, etc. and parts thereof. The logical objects include databases, applications, replications, back-ups, archive logs, virtualization schemes, configurations, policies (e.g., backup schedule, data replication scheme, high-availability configuration), clustering configurations, business entities or parts thereof or other logical entities, including metadata, etc.

The term "DP risk score" used in this patent application should be expansively construed to include any data indicative of a level of risk of effecting disaster recovery and/or business continuity status related to a given DP resource. DP risk score can be to indicative of probability of occurring a risk-related event and severity of impact of such event on the given DP resource, should this event actually occur. It is noted that the DP risk score is indicative of DP-related risk and/or DP-related health of the given DP resource.

The references cited in the background teach many principles of data protection implementation and managing that are applicable to the presently disclosed subject matter. Therefore the full contents of these publications are incorporated by reference herein where appropriate for appropriate teachings of additional or alternative details, features and/or technical background.

Bearing the above in mind, attention is drawn to FIG. 1 schematically illustrating a generalized high-level block diagram of a system for managing DP resources. In accordance with certain embodiments of the presently disclosed subject matter, the DP system is configured to enable automated identifying implemented DP scheme or parts thereof, and/or to enable automated identifying one or more DP gaps. Non-limiting examples of DP gaps include:

data inconsistency between source and target systems, such as standby cluster nodes, a host and its backup server, source application A and a target application B which needs to access a data copy of application A (caused, for example, if two distinct data items in use by the source system are replicated to the target system to reflect different point-in-time copies, or being replicated while being modified, without appropriate coherency mechanisms applied, etc.);

incomplete data between source and target systems (e.g. missing data item at the target system, used by the source system but not replicated, although required for its operation, etc.);

inappropriate hardware configuration between source and target systems (e.g. standby cluster nodes having hardware not powerful enough to perform the primary node tasks; target system with replicated operation system having hardware devices different than the source system and not functioning due to lack of appropriate device driver software, etc.);

inappropriate software configuration between related systems (e.g. on clustered system nodes, or on source and target systems can be installed different versions of the operating system or applications, thus preventing successful failover or workload move);

number of errors identified in relation to a given resource and exceeding a predefined threshold;

SLA breaches (e.g. not guaranteed maximal time difference between source and target data, certain amount of data copies, maximal time for return to operation, required redundancy level, required capacity, required software standards, required security configuration, etc.);

data accessibility and/or data path problems (e.g. wrong mapping of data or applications, zoning or masking problems in Storage Area Network (SAN) environment preventing standby or backup server data access, etc.);

data tampering (e.g. inappropriate modification of data copies performed by a system other than that for which the data is intended);

General best practice violations;

Wasting of DP resources;

Extended recovery time;

Wrong sequence of maintenance activities;

Redundancy loss (e.g., server or cluster contains a single-point-of-failure, redundant network link is down to a single active path, multiple virtual machines supporting the same application are all running on a single physical server, etc.);

Incorrect alignment between resources (e.g., server is not aligned correctly with storage, virtual machine not aligned correctly with the right network, Java application not using the right imported library, etc.);

Incorrect alignment between DP resources of different IT layers (e.g. incorrect alignment between a Virtual Machine filesystem and an ESX datastore, between and ESX datastore and a storage array, between a WebSphere application and the OS parameters, etc.);

Increasing severity of previously identified gaps, etc.

The DP resources of an enterprise or other organization can be grouped in one or more sites (111-1, 111-N) having different or same geographical location. One or more to sites can comprise $3^{rd}$ party tools (112) capable of collecting information related to DP scheme, including respective DP resources.

The system capable of managing DP resources (referring hereinafter as DP system) can be fully co-located at one of the sites, distributed between the sites or fully or partly located at a separate site (113) as illustrated in FIG. 1. The DP system comprises one or more data collecting blocks (114) operatively coupled to a dispatching block (117) in a processor (110). The data collecting blocks are configured to receive information requests from the dispatching block, correspondingly collect from the sites information related to respective DC resources, and to send the information to the dispatching block. The data collecting blocks can be located at each site or information from at least part of the sites (e.g. illustrated site 111-N) can be collected remotely. The data collecting block comprises one or more mediators (115) and/or one or more data collecting probes (116). The data collecting block is configured to request and obtain information from the $3^{rd}$ party tools (112) with the help of one or more mediators (115) and/or directly from the objects with the help of one or more probes (116). The connection with $3^{rd}$ party tools and/or DC resources can be provided via standard protocols such as WMI, SNMP, SMI-S, SSH, Telnet, remote scripting, etc., as well as via software agents installed at $3^{rd}$ party tools and configured to query the tools and to send the respective response.

The mediator is configured to communicate with one or more $3^{rd}$ party tools capable to provide information related to DP resources. The mediator comprises one or more interfaces configured to modify the requests received from the dispatching block in accordance with properties and/or capabilities of certain $3^{rd}$ party tool(s) (e.g. ECC, HiCommand, Tivoli, and other network management and/or storage resource management tools), and to enable sending the modified information requests accordingly. The mediator is also configured to transform the information obtained from certain $3^{rd}$ party tool(s) into a data structure recognizable by the DP system. The probe is configured to communicate with one or more DP resources at one or more sites, to obtain the information related to said resources and, if necessary, to transform said information into a data structure recognizable by the DP system.

In certain embodiments of the invention the DP system can be configured to obtain data directly from $3^{rd}$ party tool(s) with no need in data collecting block or parts thereof (e.g. in a case of standardization the structure of the information request and the obtained data, in a case of integration with $3^{rd}$ party tools, etc.).

The data collecting block can support different methods of collecting the information, e.g. discovery and scanning. Discovery is the process of collecting general information on the topology of the system, which can be passive, meaning that the discovered system in not aware that it is being monitored or active, which can interfere or overload the system. Scanning is the process of gathering specific information on a known object (server, application, hardware, etc.); typically the information is collected in an active form.

The dispatching block (117) is configured to interact with the data collecting block(s) (114) by sending information requests and obtaining collected data. The obtained information and/or derivatives thereof are further accommodated in one or more data repositories comprised in a memory (127) operatively coupled to the dispatching block. The data repositories include object repository database (118) containing information related to DP resources (e.g. hosts, applications, servers, and other physical and logical objects) and properties thereof. This DB also contains relationships between resources and respective DP schemes. The relationship information can be obtained via the data collecting block and/or generated by the system as will be further detailed with reference to FIG. 2.

The object repository DB is automatically updated in a manner enabling reflecting additions, removal or modification of resources and relationships thereof. The criterion for updating the object repository DB can be related to obtaining information via data collecting blocks, importing information (e.g. configuration, etc.) from other data repositories and/or $3^{rd}$ party DB, generating information by the DP system, entering information by a user, etc. The object repository DB can also comprise history data related to additions and/or deletions of DP resources and/or changes of properties and/or relationships thereof.

The data repositories also include system configuration database (119) containing to information related to the DP system configuration, e.g. installed probes, mediators and interfaces thereof, etc. The system configuration also includes configuration of dataset to be obtained for DP resources (e.g. type of resource, characteristics and/or properties to be received, etc.) and/or data collection rules (e.g. which objects need to be scanned and which objects can be excluded from further processing, etc.).

The dispatching block sends the information requests in accordance with time schedule and/or triggering event(s) (including user's request). The time schedule and/or triggering events can be preconfigured and/or configured during operating the DP system (by a user or automatically in accordance with certain rules). The dispatching block processes the obtained information and provides its preliminary analyses. The dispatching block is also configured to scan the object repository DB for detecting new resources and/or existing resources requiring further information. The results of the preliminary analysis and/or scanning the object repository DB (e.g. detected new resource, detected need in additional information, etc.) can serve as triggering events for sending information request to the data collecting block. The requests can be, for example, for information discovery (e.g. retrieving information from certain $3^{rd}$ party tool) and/or for scanning (e.g. to scan certain resource for specific properties). The request comprises information related to resources to be discovered/scanned, properties to be retrieved, etc. Based on information comprised in the configuration DB and the object repository DB, the dispatching block is capable to decide if the results of analysis/scanning shall trigger a new request and/or to decide about a content of said request (e.g. by comparing information accommodated in the object repository DB with requirements for information to be obtained, said requirements and rules for decisions accommodated in the configuration DB).

Collecting data about certain physical resources can result in discovering a new physical resource to be added to the object repository DB and further scanned for obtaining its characteristics and relationship thereof. For example, scanning a storage device typically yields some information regarding the host(s) connected to that device, said host(s) can be missing in the object repository DB. In certain cases obtained data can be insufficient for adding the discovered resource to the DB. Such resources can be provided with special handling, including requesting human assistance.

Collecting data about physical DP resources can also identify new logical resources related to the physical resources. Said logical resources and relations thereof are added to the object repository DB and further scanned for obtaining information in accordance with requirements accommodated in the configuration DB. The process can be recursive, for example, data collecting about a host can discover a database related to the host; data collecting about the database can discover additional logical resources such as, for example, table-spaces, tables and data files, etc.

The dispatching block can be configured to consolidate the data obtained from data collecting blocks into one or more queues for further processing before entering into the object repository DB. The processing can include the following operations:
  filtering data and removing surplus or other unnecessary data;
  validating the correctness of the data (structure wise);
  solving conflicts in data coming from different sources, etc.

Data validation and/or solving conflicts can be provided in accordance with a predefined set of priorities and/or other guidelines and logic associated with certain probe, mediator, resource, data type, etc. For example, a conflict can be resolved by assigning to certain probe a priority higher than assigned to another probe, etc.

The data repositories further include event history database (120) comprising information related to DP gaps discovered during the DP system operating; and rules database (121) further detailed with reference to FIG. 2.

The data repositories (118-121) are operatively coupled to the processor (110), and can be exposed to other $3^{rd}$ party tools (126) or any other appropriate type of external system through the communication block (124) using any type of messaging, APIs or other communication methods, or through other mechanisms including JDBC or similar query mechanism access to the actual repositories or to copies or views thereof. The processor comprises the dispatcher block (117), an analysis block (122) further detailed with reference to FIGS. 3-4, a user interface block (123), a communicating block (124), and a scheduler (125).

The user interface block (123) is configured to enable one or more users to communicate (e.g. as web clients) with the DP system (e.g. for topology browsing as further detailed with reference to FIG. 5, monitoring DP resources, etc.). The user interface block is also configured to provide administrative functions necessary for operating the DP systems, for example, authorization and access control, licensing, user/ role management, etc. The user interface can enable, for example DP system configuring, reporting and other administrative functions.

The communicating block (124) is configured to enable communication with various network monitoring systems, storage resource management systems, enterprise consoles, customer portals, IT asset repositories and other management systems installed in the user's environment (e.g. Tivoli, HP OpenView, Topaz, HiCommand, vCenter, ServiceNow, etc). The block is configured to notify these systems on events related to DP resources and to enable said system to access the DP system through specific APIs.

The scheduler (125) is further operatively coupled to the analysis block and dispatching block. The scheduler comprises an execution configuration of the DP system (e.g. time schedules and/or rules for execution operations by the functional blocks), and is configured to communicate with the functional blocks for providing information and/or commands related to execution configuration. Interfaces for external schedulers can be provided to allow 3rd party tools (e.g. Control-M, etc.) to interact with the DP system and perform orchestration. At least some of the tasks can be scheduled to run continuously or in real-time.

Those skilled in the art will readily appreciate that the invention is not bound by the configuration of FIG. 1; equivalent functionality can be consolidated or divided in another manner. In different embodiments of the invention the blocks and/or parts thereof can be placed in multiple geographical locations; operative connections between the blocks and within the blocks can be implemented directly or indirectly, including remote connection. The connection can be provided via Wire-line, Wireless, cable, Internet, Intranet, power, satellite or other networks and/or using any communication standard, system and/or protocol and variants or evolution thereof. The functions of the blocks can be implemented in (or integrated with) different physical equipment. The invention can be implemented as an integrated or partly integrated part within $3^{rd}$ party equipment as well as in a stand-alone form.

Those skilled in the art will also readily appreciate that the data repositories can be consolidated or divided in other manner; some of these databases can be shared with other systems, including $3^{rd}$ parties systems.

Figure 2:
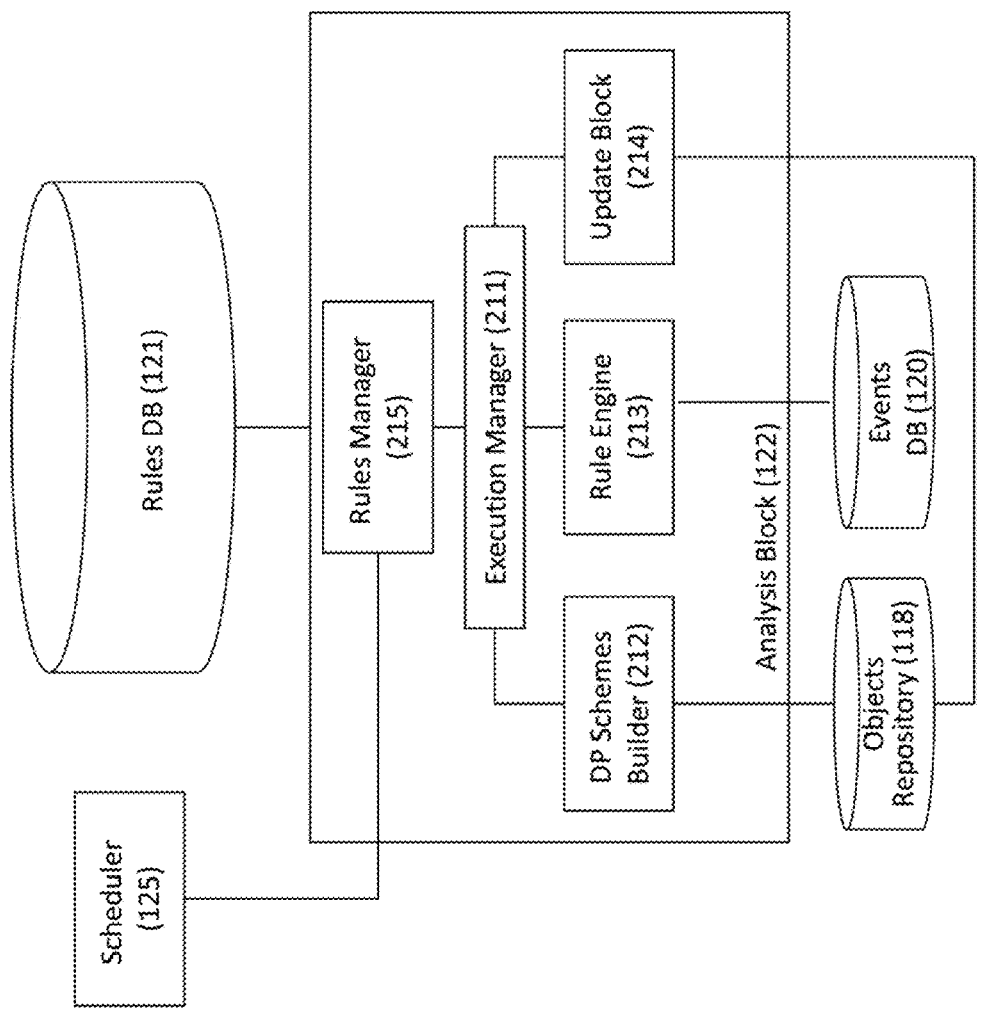
FIG. 2 illustrates a generalized block diagram of an analysis block in accordance with certain embodiments of the presently disclosed subject matter.

Referring to FIG. 2, there is illustrated a generalized block diagram of the analysis block in accordance with certain embodiments of the presently disclosed subject matter. The analysis block (122) is configured to identify implemented DP schemes and/or DP implementation gaps related to said schemes. The analysis is provided in accordance with rule specifications accommodated in the rules database (121). The rules can be related to relationship analysis, identifying new DP resources, characteristics and relationship thereof, DP scheme identification and generation, object repository update, DP gap analysis and/or combination thereof, etc. The rule specification comprises a rule scope, a condition including rules logic and criterion to be satisfied; and an action which shall be drawn from the rule when the condition is satisfied. The rule scope defines a range of DP resources or DP schemes where respective rule is applicable. The action to be drawn can include any compound actions, including, for example, several actions and/or registered conclusion and/or their logical combinations.

As will be further detailed with reference to FIG. 3, the analyses block can be further configured to use the identified DP gaps for assessing DP risk score to DP resources in the DP schemes. The DB risk scores assessed to DP resources can be accommodated in the configuration DB (119) together with a time stamp indicative of point in time of identifying the respective gaps.

The rules accommodated in the rules DB (121) can be updated by the user, and/or updated through an automated update mechanism, e.g. rules learned at one user can be modeled and distributed to other users similar to the update of anti-virus signatures.

The analysis block comprises an execution manager (211) operatively coupled to a DP schemes builder (212), a rule engine (213) and a rule manager (215).

The rule manager (215) is further operatively coupled to the scheduler (125) and is configured to receive from the scheduler commands related to one or more rules to be executed. The rule manager is also operatively coupled to the rules DB (121) and is configured to obtain from the rules DB one or more rule specifications to be executed and to transfer said specification to the execution manager. In certain embodiments of the invention the rule manager can be also operatively coupled to the user interface and configured to enable rule configuration-related actions to be provided via user interface as, for example, adding new rules, removing or changing existing ones, configure which rules to execute and when, etc.

The execution manager is configured to receive from the rule manager specification(s) of one or more rules to be executed, and to transfer said specification(s) to the DP schemes builder (212). The DP schemes builder is configured to receive the rule specification, to extract a list of DP resources specified in the rule, to generate a request to the object repository DB (118) for information accommodated thereof and related to one or more resources specified in the rule, to generate, based on the received information, respective DP scheme(s) and to transfer said DP scheme to the execution manager. Obtaining and/or generation of the DP scheme can be performed in various ways (e.g. as the result of a SQL query for information comprised in the objects DB, as a multi-step process comprising identifying relationship between DP resources, etc.). The generated DP schemes can be generated for operational purposes only or further stored in the objects DB.

The execution manager is further configured to receive the generated DP scheme and to transfer it together with rule specification to the rule engine (213) configured to run the rule in accordance with received specification and DP scheme. The rule engine is further configured to update corresponding data repositories, e.g. to update the events history DB (120) if the rule's execution is resulted in finding a gap, and to update the objects repository DB (118) if the rule's execution is resulted in setting a relationship (or changing or removing an existing relationship) between the DP resources.

For example, relationship rules can result in adding one or more dependencies between two or more DP resources (objects); the non-limiting examples of dependences to are illustrated in Table 1.

TABLE 1

| | Object 1 | Object 2 | Condition: nature of dependency | Notes |
|---|---|---|---|---|
| 1. | Storage volume | A host | The host "uses" the volume | One host can use more than one volume (frequent phenomenon), and one volume can be used by more than one host (infrequent phenomenon, can be found in cluster environments) |
| 2. | Storage volume | A storage device | The storage device "contains" the volume | |
| 3. | Storage device | Another storage device | The two storage devices are connected to the same fabric | |
| 4. | Storage device | Another storage device | One of the storage devices is configured with software or hardware replication to the other storage device | |
| 5. | Storage volume | Another storage volume | One of the volumes is a local copy of the other | Subtypes of copies can exist (for example, "BCV" copy, "Snapshot" copy) |
| 6. | Storage volume | Another storage volume | One of the volumes is a remote copy of the other | By "remote" it means that the two volumes are not contained on the same storage device |
| 7. | Host | Application | The application is installed on the host | One host can have more than one application installed and one application can be installed on more than one host |
| 8. | Application | File | The application uses the file | |
| 9. | File | Volume | The file is contained in the volume | |
| 10. | Volume | Volume group | The volume is contained in the volume group | |
| 11. | Application | Domain entry | The application uses the domain entry | Domain entries can be, for example, host names, user profiles, etc. |
| 12. | Application | Registry entry | The application uses the registry entry | |
| 13. | Java application | Imported library | The Java application uses the library | |
| 14. | Java application | JVM | The Java application runs on the JVM | |

In the examples illustrated in Table 1 the relationship rule is applied to Object 1 and Object 2 (in accordance with rule specification); upon matching respective condition the DP resources are considered to be related with a nature of dependency corresponding to the condition. Said conclusion following by updating the object repository DB is the action specified in the rule to be drawn when the condition is satisfied.

More complex relationship rules can be used to deduce additional dependencies from already discovered dependencies. For example:
  if an application uses a file (dependency 8), and the file is contained in a volume (dependency 9), then the application uses the volume;
  if host A uses a volume (dependency 1), and that volume has a remote copy (dependency 6), and the volume which is a remote copy is used by another host B, then host B is "using replicated information" of host A;

if it is detected that certain application (such as Oracle) is installed on host A and uses volume 1 (as described above), and similar application is installed on host B using the replica of volume 1, then it can be calculated that "host B is a candidate application standby of host A"

Following is an example of a gap analysis rule:

<Scope of the Rule: DP Scheme>:
  Oracle databases, from version 9i and above, which have an instance protected by using EMC SRDF, in asynchronous mode, wherein the DP resources comprised in the DP scheme are characterized by the following:
  Version of Oracle software;
  List of data files used by the Oracle machine;
  List of storage volumes used by the Oracle machine;
  Mapping of data files used to volumes used;
  Dependencies, if exist, between any two volumes used;
  List of replicas existing for the used volumes;
  Dependencies, if exist, between any two replicas
<Condition Logic>
  For each Oracle instance;
  If more than one data file exists, AND;
  If more than one volume is used containing data files, THEN;
  For each replica of the used volumes, calculate replication SLA (replica time, volume group, DP risk score, target storage device), AND;
  Unless all calculated replication SLAs are identical, THEN;
  ACTION
<Action>
  Identify the gap and update the event DB accordingly.

In certain embodiments of the invention the instructions comprised in the rule specification can be written using a rule language. The rule language includes at least the following categories:
  "Find the object" as, for example, single object, pairs of objects, group of objects, object representing connection between other objects (e.g. the replication connection between two Oracles is considered as an object);
  "Comparing and validating the objects" as, for example, to validate that the object has certain characteristic and/or value thereof, comparing two objects' characteristics and/or values thereof. The comparison can be provided straightforward (e.g. verifying that the value is the same), using a comparison function that can compare the values according to certain logic, etc.
  "Updating the object repository DB" with additional properties or objects, this is used mainly to add dependency connection between two objects.

Non-limiting examples of rule language functions are illustrated in Table 2.

TABLE 2

| Category | Parameters | Output |
| --- | --- | --- |
| FindObject | Matching criteria [, Matching criteria] | List of Objects that match the criteria |
| FindObject/ FindMatches | Matching criteria [, Matching criteria] | List of Pairs (or more) of objects that match the criteria |
| Compare | Object, Object, Property Name, Comparison Function [, Property Name, Comparison Function] | Compare properties of two objects according to a comparison function |

TABLE 2-continued

| Category | Parameters | Output |
| --- | --- | --- |
| Validate | Object, Property Name, Expected Value [, Property Name, Expected Value] | Validate the actual values of the object's properties against the expected values |
| AddConnection | Object, Object, Connection Type [, Property Name, Property Value] | Add a connection between two objects,. properties can be added to the connection object that will be created |

Other language categories (e.g. AddObject, UpdateObject, DeleteObject, UpdateConnection, DeleteConnection, etc.) and respective rule language functions can be constructed in a similar manner.

The gap analyses rules can also specify which resources in respective DP scheme have been affected by a certain gap and which resources have an effect on other resources involved in the certain gap. It is noted that in some cases the same DP resource can have in a certain gap both roles—it can be affected by the gap and also can have the effect on other resources involved in the same gap.

Likewise, the gap analyses rules can also specify severity of affecting different resources by a certain DP gap (by way of non-limiting example, in a case of a DP resource comprising hundreds of load-balanced servers, a gap indicating high risk that one out of such servers is down has high severity for this server and low severity for the entire DP resource). The following non-limiting examples illustrate the language application. The gap analysis rules will be further detailed with reference to FIG. 4.

1) Example of relationship rule: Create a dependency between two Oracle applications that have a replication connection, the replication connection is deduced from one Oracle that uses a SAN storage that is replicated to a different SAN storage which is used by the other Oracle application:

```
Matches = FindMatches("MATCH    object    type:Oracle",
            "object type:Connection,           connection
type:Uses",
            "object                             type:SAN",
            "object type:Connection,           connection
type:Replication",
            "object                             type:SAN",
            "object type:Connection,           connection
type:UsedBy",
            "MATCH object type:Oracle")
    AddConnection(Matches, "Replication")
```

2) Example of gap analysis rule #1: Verify that all replicated Oracles have the same HW configuration:

```
Matches = FindMatches("MATCH    object    type:Oracle",
            "object type:Connection,           connection
type:Replication"
            "MATCH object type:Oracle")
    Compare(Matches,   "CPU",         "CPU"        Compare",
            "OS",          "",
            "Memory",      "Memory Compare")
```

3) Example of gap analysis rule #2: Verify that the SLA for Oracle replication is less than 2 hours:

```
Object     =     FindObject("object    type:Oracle",
           "object type:Connection,     connection
type:Uses",
           "object                      type:SAN",
           "MATCH object type:Connection,  connection
type:Replication",
           "object                      type:SAN",
           "object type:Connection,     connection
type:UsedBy",
           "object type:Oracle")
    Validate(Object, "Schedule",  "<2 Hours")
```

4) Example of gap analysis rule #3: Identify DP resource of type "BusinessObject" health degradation:

Object=FIndObject ("object type:BusinessObject"),

Validate (Object, "DP risk ScoreChangeSinceLastScan", "<XXX")

Where XXX is a configurable threshold. Those skilled in the art will readily appreciate that the comparison criteria can be of arbitrary complexity and user-configurability, including, for example, the ability to:

Detect risk in only specific types of business objects or in other types of DP resources Determine more sophisticated criteria for alerting, including specific change trending, statistical analysis, data clustering, custom logic, and other The scope of the rules can be characterized by different combinations of DP resources, their properties and relationships thereof as, including, for example:

a combination of recent and past information about the DP resources (including assessed DP risk scores) and their properties including multiple values from different points in time related to the same DP resource and/or property;

a combination of recent and past information about relationships and properties of certain DP resource including multiple values from different points in time related to the same relationship and/or property;

a combination of historical information about DP resources with information comprised in the event history DB, including events representing identified gaps; DP risk scores assessed to respective DP resources, etc.

The following example illustrates a rule with a scope comprising at least one previously registered gap.

If a primary host and a standby host are both mounting network file systems; AND;

If each host (primary or standby) uses a different file-server, AND;

If the file server sharing the network file system that the primary server mounts is storing the data on a storage resource, and that storage resource is replicated to a second file server; AND;

If the said second file server is exporting the replicated data; AND;

If the standby host is mounting a network file system stored on said replicated data resources on the said second file server;

THEN

If there exists one or more recent gap events in the event history DB related to either the fileservers and the said storage resources; OR to the replication of the said resources

THEN

Create a new gap event relating to the primary and standby host, specifying that the standby is accessing a replica of the data used by the primary, while the replica has a DP risk.

The above example illustrates a gap rule for identifying risk of deployment inconsistencies in the access of network file systems by primary and standby host pairs. Note that the different DP resources involved could be easily classified by the part they take in case-and-affect potentially captured by the gap rule. In this case:

The standby host is "affected" (and therefore, higher risk-score may be assigned to it than that assigned to other DP resources)

The primary host is "involved" (could be assigned with a more moderate, or even no risk score change)

In case the condition triggering the gap event were related to replication—the replication link between the two file systems or storage resources may be "causing" the issue Those skilled in the art will readily appreciate that the invention is not bound by the configuration of FIG. 2; equivalent functionality can be consolidated or divided in another manner.

Figure 3:
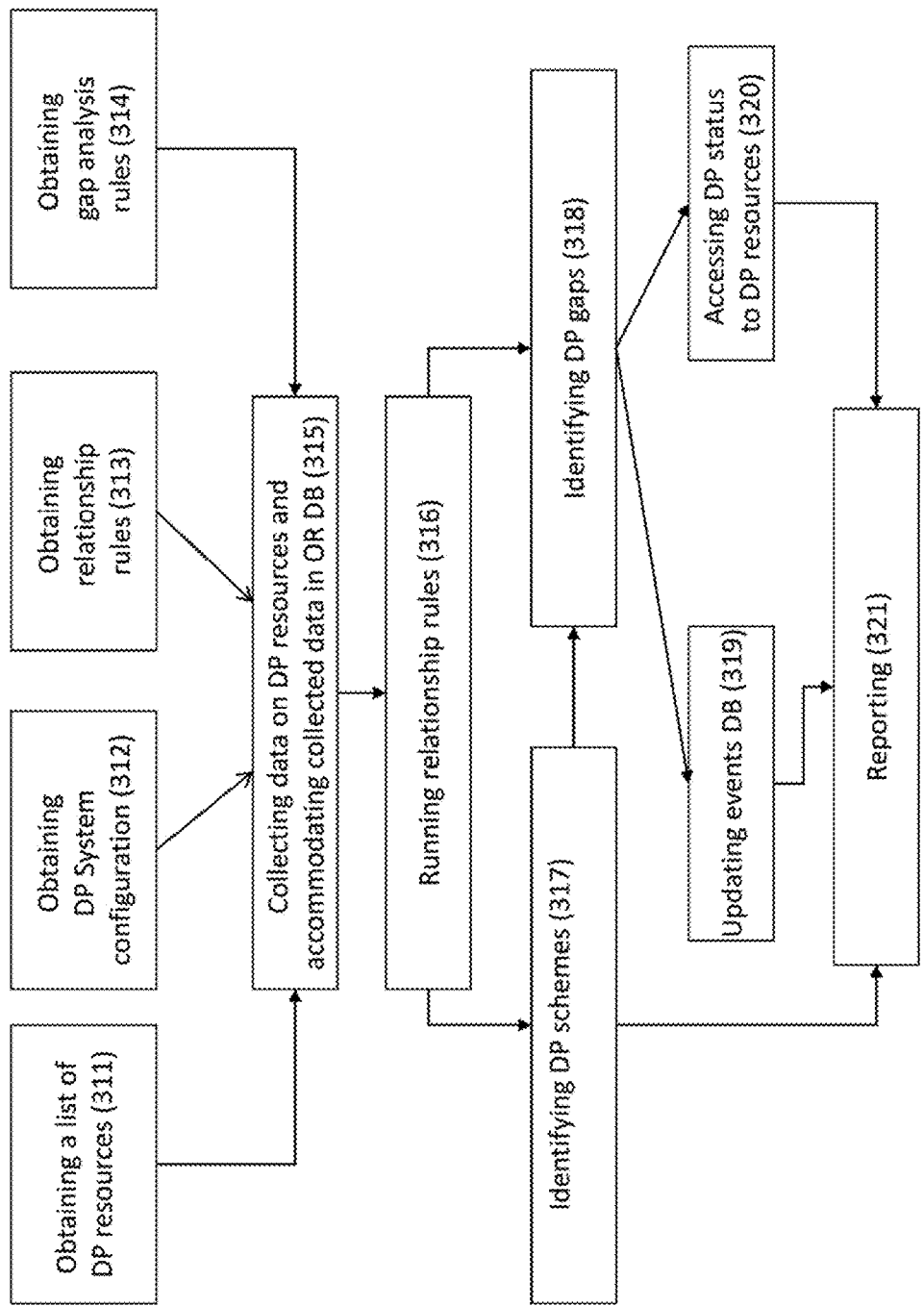
FIG. 3 illustrates a generalized flow diagram of assessing DP status for managing DP resources in accordance with certain embodiments of the presently disclosed subject matter.

Attention is drawn to FIG. 3 illustrating a generalized flow diagram of the operations in DP management system in accordance with certain embodiments of the presently disclosed subject matter.

As illustrated in FIG. 3, the system operation starts with obtaining a list of DP resources (311), obtaining configuration of DP system (312), obtaining specification of relationship rules (313) and obtaining specification of gap analysis rules (314). The information can be obtained entirely or partly by manual input, imported from existing documentation, collected from external sources (installed at the user site as, for example, network management or storage resource management systems: and/or remote sources as, for example, knowledge database), from the DP resources or otherwise obtained. The obtained information related to list of DP resources is accommodated in the object repository DB (118). The obtained DP system configuration (e.g. installed probes, mediators and interfaces thereof, configuration of dataset to be obtained for different DP resources, data collection rules, data collection and rules execution schedules and preconfigured triggering event, etc.) is accommodated in the configuration DB (119). The obtained rules specifications are accommodated in the rules DB (121).

When prepared for operation, the DP system starts to collect data (315) of DP resources as was detailed with reference to FIG. 1. The collected data are accommodated in the object repository DB, the DP system runs relationship rules (316) as was detailed with reference to FIG. 2 and updates the object repository DB in accordance with results of the rules execution. Certain data, when accommodated, can trigger a new round of data collecting in accordance with configured triggering events.

As will be further detailed with reference to FIGS. 4-5, the DP system analyzes the data accommodated in the object repository DB for identifying DP schemes (317) and for identifying DP gaps (318) and updates the object repository DB accordingly. The DP gaps can be identified by running gap analysis rules. Some of the gap analysis rules can be implemented regardless identifying the DP schemes (e.g. as was detailed with reference to FIG. 2), wherein the scope of another rules is characterized by certain DP schemes as will be further detailed with reference to FIGS. 4-5. The identified gaps are accommodated (319) in the events DB. The DP gaps accommodated in the events DB can be sorted in accordance with their severity (e.g. critical, high risks, moderate risk, low risk, info), in accordance with their type of impact (e.g. leading to complete data lost, significant risk to data, prolonged downtime, service disruption, improvement opportunity, waste of resources), change rate of their severity and/or impact or otherwise.

The DP system further uses the identified DP gaps for accessing (320) DP risk score to at least part of the DP resources.

DP risk score of a given DP resource can be calculated as a function of respective one or more DP gaps associated with the DP resource, severities of these DP gaps; state of the DP resource (e.g. network adapter state obtained from the OS can be "faulted", "running", stopped" and similar, cluster service group state obtained from the clustering software can be "online", "offline", "faulted", "in jeopardy", etc.), etc.

If a given DP resource comprises a collection of other DP resources (for example, a Cluster comprising multiple servers), DP risk score of such DP resource can be calculated as a function (e.g. aggregation) of DP risk scores of the comprised DP resources.

As a certain gap can affect only a part of resources in respective DP scheme, in certain embodiments of the invention the DP system can be configured to recognize, among DP gaps associated with the given resource, DP gaps affecting the given resource and to calculate DP risk score as a function of such gaps only. The DP system can be further configured to define severity of a given gap with regard to the given resource, and calculate the DP risk score accordingly.

By way of non-limiting example, OP risk score can be assessed as a category corresponding to a certain range of risk levels (e.g. high, medium and low DP risk scores).

The rules can be scheduled to run at a desired frequency (e.g. from several times a week to several times a day, according to the configuration chosen by the user), and/or triggered by certain events (e.g. a notification from an external SRM system that a new volume has been created, notification by an NMS system that a new server has been detected, new obtained dependency between DP resources, user's request, etc.).

The rules' execution can be governed by certain considerations regulating execution scope and/or sequence. For example, the user can
  customize conditions of one or more rules for a certain scope (e.g. for certain server(s) ignore performance differences less than 50% between source and target servers);
  determine a precedence for rules with overlapping scopes;
  determine the execution sequence in accordance with certain parameters, e.g. the scope of the rule (e.g. a rule detecting missing volumes at the application level will be run before a rule detecting missing volumes at the host level), etc.

The system can further generate (322) reports (e.g. alerts, tickets, logs, etc.) to be provided to the user and/or 3$^{rd}$ party systems. As will be further detailed with reference to FIG. 6, the system can also provide visual representation of the data accommodated in the object repository DB and the events DB.

The reported gap can be characterized by the following attributes:
  category of the gap (e.g. data inconsistency, incomplete data, inappropriate hardware or software configuration, SLA breaches, data accessibility and/or data pass problems, etc.), the gap can be assigned more than one category;
  the applicable DP scheme and/or respective DP resources; in certain embodiments of the invention each DP resource comprised in the DP scheme is associated with a unique identifier indicating the relation of this resource to the gap (e.g. for the gap characterized by software incomparability between active and standby servers each resource shall be identified as an active or a standby);
  the time of gap detection;
  the time the gap was dismissed;
  the severity of the gap;
  ability to acknowledge the gap (mark as "not a gap") and others.

The generated reports can also be indicative of:
  configuration of specific DP resources (e.g. can comprise a list of software tools installed on servers that belong to a specific Cluster or any other type of server group, including Business Service, etc.);
  DP risk score for specific DP resources and groups thereof (e.g., current aggregated DP risk scores, DP risk scores determined in different time spans, such as: last day, last week, last month, etc.);
  Limited to only specific risk impact categories (e.g., "downtime risk", "data loss risk")
  SLA compliance status of DP resources and groups thereof.

It is noted that reports can be grouped by DP resources types, DP resources properties, etc., and can include statistical or otherwise processed information regarding multiple DP resources. It is also noted that reports can be provided and delivered in multiple formats, including: documents (text. HTML, MS-Word, PDF, etc.), messages (email, SOAP/XML, message Queues, Middleware events), and other formats. Attention is drawn to FIG. 4 illustrating non-limiting example of generalized DP scheme matching a gap profile of "wasted resources".

In accordance with certain embodiments of the presently disclosed subject matter the DP gaps can be formalized and characterized by certain profiles. The gap profile is descriptive of a pattern which constitutes a known DP violation (e.g. in accordance with best practice, benchmarking, knowledge database, previous gap-related analysis, etc.). Accordingly, the gap analysis rule can specify the gap profile as a combination of scope and condition (e.g. DP scheme in combination with one or more predefined violations and logic of their analysis) and/or derivatives thereof to be inspected in order to identify certain gap(s). Accordingly, the identifying is provided by matching one or more specified gap profiles to a respective DP scheme.

The gap profiles can be accommodated and maintained as part of the gap analysis rules and/or in a dedicated database. In certain embodiments of the invention the DP system is configured to enable:
  creation of a new gap profile;
  updating an existing gap profile;
  marking a gap profile as obsolete/terminated;
In the non-limiting examples illustrated with reference to FIGS. 4-5, the gap profile comprises combination of DP scheme and DP gap-related conditions (e.g. predefined violations and logic of their analysis).

Figure 4:
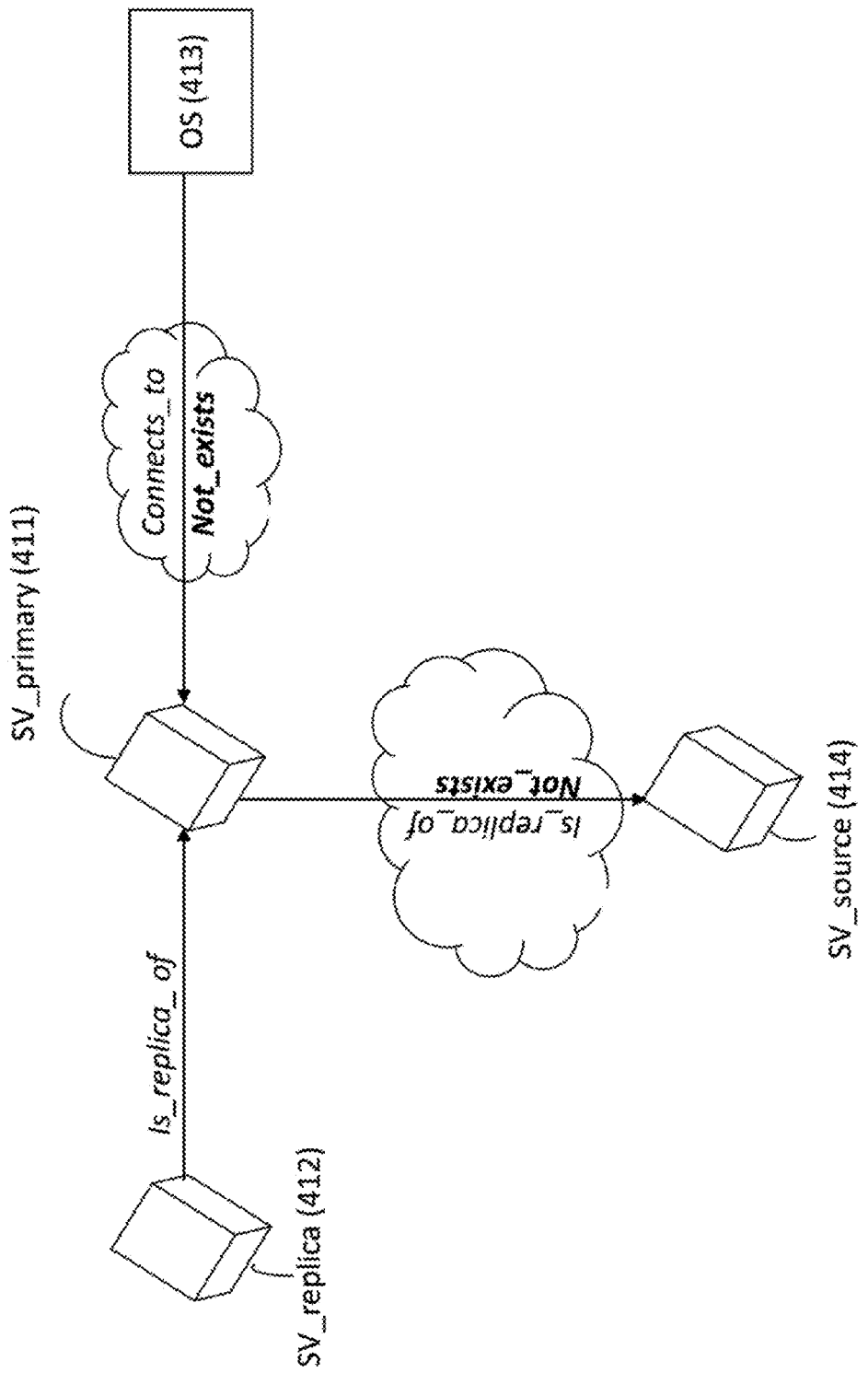
FIG. 4 illustrates an exemplified DP scheme matching a certain gap profile in accordance with certain embodiments of the presently disclosed subject matter.

The DP scheme illustrated in FIG. 4 comprises DP resources such as primary storage volume (411), its replica (412), operating system (413) and storage volume (SV) (414), characterized by the following relationship:

SV (411) is not itself a copy of any other SV; (a fact apparent from the condition "not_exists" between itself and SV (414), which means that no SV exists, of which SV (411) is a replica);

Similarly, SV (411) is not connected to any OS (likewise, concluded from the "not_exists" condition it has with OS (413), which means that there does not exist an OS which connects to SV (411));

SV (411) has a copy SV (412).

DP gap-related condition specifies that if a DP scheme comprising above DP resources does not comprise a relationship enabling OS access to the primary SV, the gap is considered as "wasted resources at primary SV".

Accordingly, running the respective rule resulting in identifying a DP scheme matching the above profile means that a gap with the respective profile is identified.

The following is a non-limiting example of representing the above gap profile in XML-based language:

```
<?xml version="1.0" encoding="UTF-8" ?>
    <pattern-definition id="Primary SV not connected to OS">
        <description: This pattern represents a scope for matching primary
SVs with replicas, which are not used by any OS>
        </description>
<select>
        <item id="SV_Primary">SV</item>
        <item id="SV_Replica">SV</item>
        <item id="StorageArray_Primary">StorageArray</item>
        <connection id="SV_Replica_SV_Primary"
from="SV_Replica"
to="SV_Primary">IsReplicaOf</connection>
        <connection id="StorageArray_Primary_SV_Primary"
from="StorageArray_Primary"
            to="SV_Primary">Has</connection>
</select>
<condition>
<type id="SV_Primary">SV</type>
<type id="SV_Replica">SV</type>
<type id="StorageArray_Primary">StorageArray</type>
<type id="StorageArray_Primary_SV_Primary">Has</type>
<type id="SV_Replica_SV_Primary">IsReplicaOf</type>
<not> <exists>
        <select>
            <item id="SV_Source">SV</item>
            <item id="SV_Primary">SV</item>
                <connection    id="SV_Primary_SV_Source"
            from="SV_Primary"
            to="SV_Source">IsReplicaOf</connection>
        </select>
        <condition>
            <type id="SV_Primary">SV</type>
            <type id="SV_Source">SV</type>
                <type
            id="SV_Primary_SV_Source">IsReplicaOf</type>
        </condition>
</exists> </not>
<not> <exists>
        <select>
            <item id="OS">OS</item>
            <item id="SV_Primary">SV</item>
            <connection    id="OS_SV_Primary"    from="OS"
to="SV_Primary">ConnectsTo</connection>
        </select>
        <condition>
            <type id="SV_Primary">SV</type>
            <type id="OS">OS</type>
            <type id="OS_SV_Primary">ConnectsTo</type>
        </condition>
</exists> </not>
</condition>
</pattern-definition>
```

In accordance with certain embodiments of the presently disclosed subject matter, certain DP resources and relationship thereof comprised in the DP scheme can be grouped in accordance with certain rules, wherein conditions specified in the gap profile can be applied to said physical and/or logical groups and/or combinations thereof.

For example, a parent resource (e.g. host, Operating System ("OS"). OS Volume Group ("VG"), Oracle instance data files, application, etc.) can be associated with a group of data accommodating resources (e.g. storage volumes, blocks on disk(s), segments of memory, entities within directory services, files, file systems, network file systems, etc.) characterized by completeness and consistency requirements with regards to said parent resource. Such a group of data accommodating resources associated with a parent resource is referred to hereinafter as a meaningful resource group (MRG).

For example, a Business Entity (e.g., "Supply Chain Management application", which in turn can be a component of the larger Business Object "ERP") can be chosen as a parent resources. MRG associated with the Business Entity can include Database Instances, File Systems, Object storage, Storage Volumes and network storage associated with DP resources corresponding to the Business Entity.

For example, a Unix (e.g., HP/UX, AIX) Volume Group can be chosen as a parent resource. Storage volumes (SVs) constituting the VG can be grouped in MRG associated with the parent resource; the set of an Oracle Instance data files can be handled as an MRG associated with Oracle Instance as a parent resource: ERP application can be regarded as a parent resource associated with MRG comprising a set of files, DNS entries, password entries stored in a password file, configuration files, etc.

An MRG can comprise data accommodating resources, other MRGs or any combination thereof. For example, an Oracle Instance can be associated with several MRGs comprising different combinations of Oracle Data files MRG, Oracle control files MRG, Oracle Log file MRG and an Oracle archives MRG.

Another logical ordered group can comprise a sequence of replica techniques used for each replication between a source data accommodating resource and a target data accommodating resource. Such group is referred to hereinafter as a layout path. Replication techniques include, for example, clones, Business Continuous Volumes (BCV), remote replication, snapshots, snapshot mirrors, scripts, software replication tools, manual copies, etc. Non-limiting examples of above groups are illustrated in FIGS. 5a-5c.

Figure 5A:
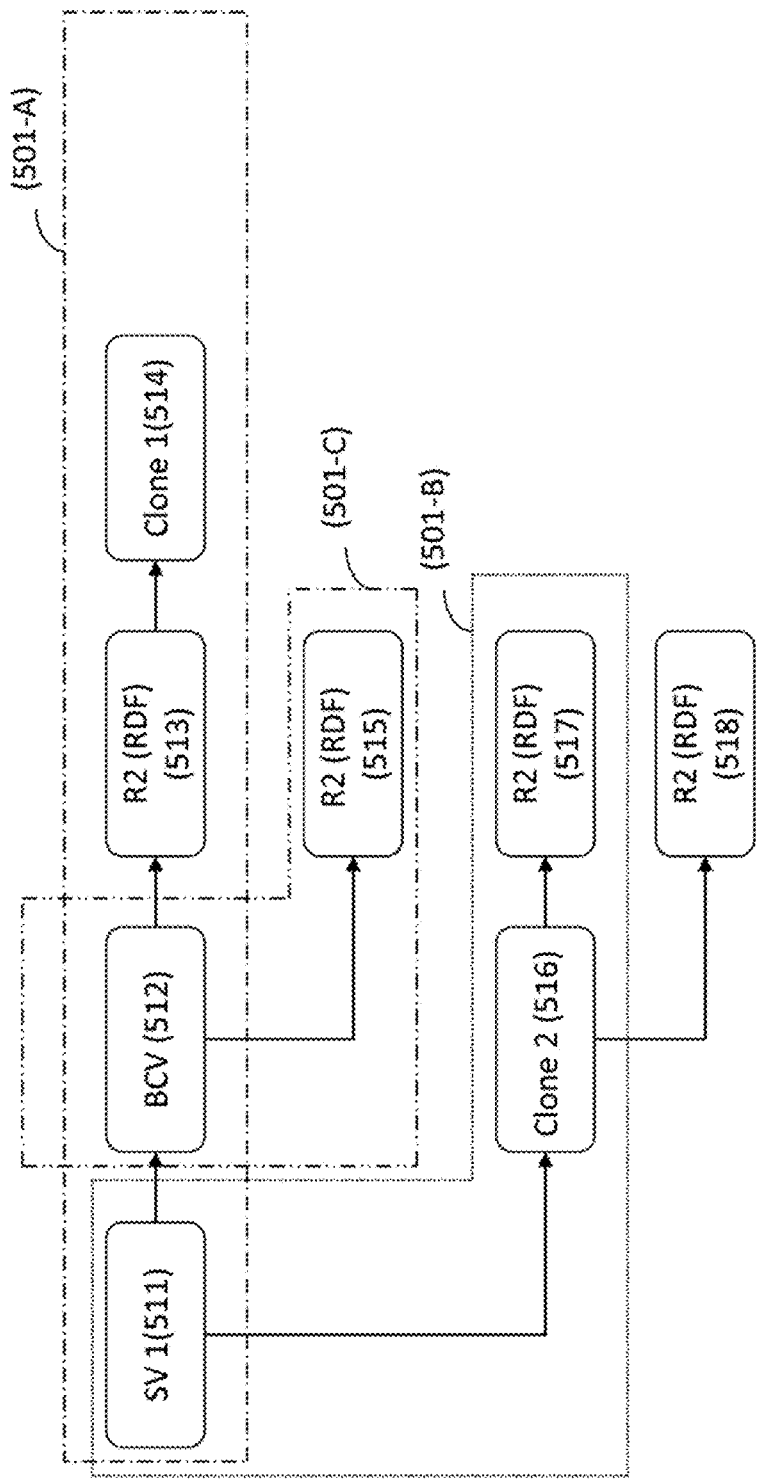
FIGS. 5a-5c illustrate exemplified DP schemes with grouping provided in accordance with certain embodiments of the presently disclosed subject matter.
Figure 5B:
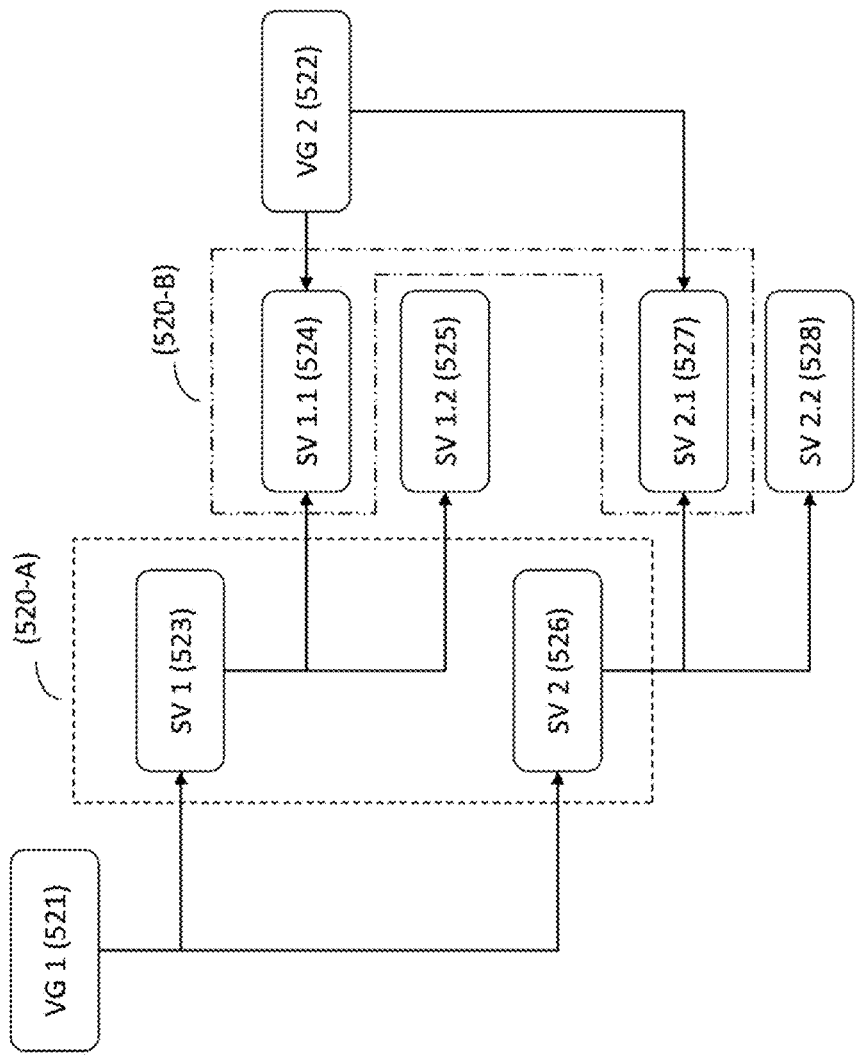
Figure 5C:
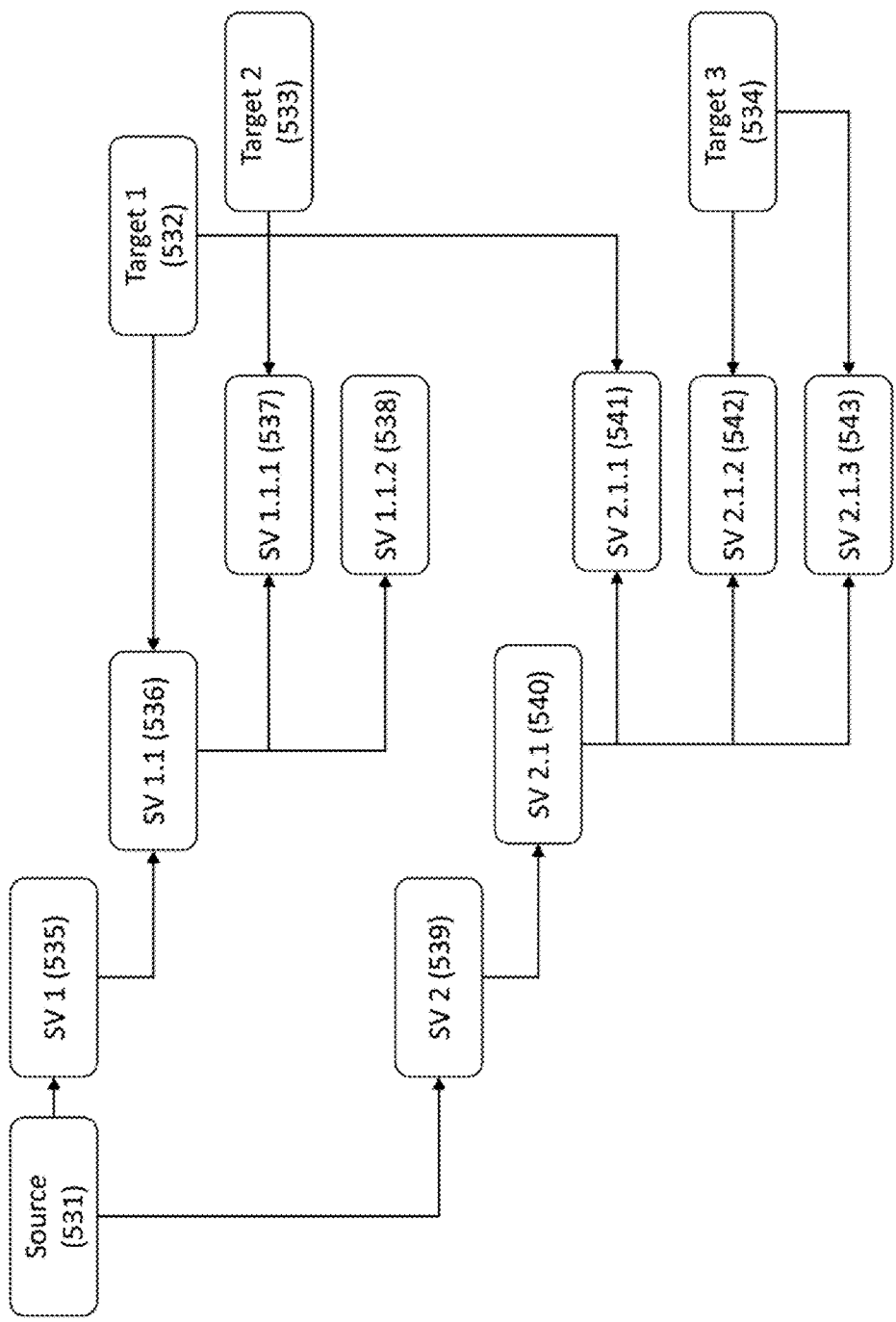

FIG. 5a illustrates a non-limiting example of grouping DP resources comprised in DP scheme in layout paths. In the illustrated example the DP scheme comprises a storage volume SV 1 (511) having two direct copies, each of which has copies of its own in a tree-like fashion. These DP resources can be grouped in several (optionally overlapping) layout paths. For example:

a layout path (501-A) between SV 1 (511) and Clone 1 (514), which has a sequence of the following replicas: BCV (512), R2 (RDF) (513) and Clone 1 (514);

a layout path (501-B) between SV (511) and R2 (RDF) (517) which has sequence of the following replicas: Clone 2 (516) and R2 (RDF) (517); a layout path (501-C) between BCV (512) and R2 (RDF) (515); etc.

A high risk score can be assessed to BCV (512) since existing DP gap indicates that it is susceptible for tampering by unauthorized servers.

Layout paths can be compared for equality or inequality. For example, the two layout path between SV 1 (511) and SVs (518), (517) are the same (i.e, both paths include Clone replication then RDF replication), while the layout path between SV 1 (511) and SV 515 is different (i.e., path includes BCV—rather than Clone—replication and then RDF).

The condition in the gap profile can be formulated with regard to one or more layout paths, for example the DP gap can be specified as violation of best practice requiring that a parent (not shown), e.g., a Unix VG that is using SVs which are replica of other SVs should have all said replica SVs with the same layout path.

Referring to FIG. 5b, there is illustrated another non-limiting example of grouping resources in certain DP schemes in accordance with certain embodiments of the presently disclosed subject matter.

The illustrated DP scheme comprises two parents VG1 (521) and VG 2 (522). The storage volumes SV1 (523) and SV2 (526) constitute a MGR1 (520-A) associated with VG1, the storage volumes SV1.1 (524) and SV2.1 (527) constitute MGR2 (520-B) associated with VG2. The storage volume SV1.1 (524) is a replica of the storage volume SV (523) and there is a layout path between the two. Similarly, another layout path exists between SV2.1 (527) and its replica of SV2 (526). It shall be noted that in the illustrated DP scheme other layout paths exist, and DP resources can be grouped in other ways.

The gap profiles can be specified with respect to one or more illustrated and/or other groups and/or relationship thereof. For example, a gap can exist if an MRG comprises SVs of different types, e.g. if a VG is using SV1 is stored at a local disk and SV2 stored on SAN with mirroring. Such violations can likely result in several problems:

Performance of the VG will be degraded compared to a VG comprising only mirrored SAN volumes Reliability of the VG is significantly reduced compared to a VG comprising only mirrored SAN volumes A user can configure replication based on the SAN infrastructure to replicate all SVs in the storage array containing the VG. Doing this, the user can falsely believe that the VG's data is well protected, while in fact, in case of a storage malfunction or disaster, there will be no valid replica of the entire VG, since one of the SVs (the local one) is not, in fact, replicated.

As another example, a gap can exist if an MRG comprises SVs of different update time. Consider SV1.1 (524) and SV2.1 (528) constituting MRG (520-B) associated with VG2 (522). If, for example, SV1.1 (524) had finished its last update at time T1, whereas SV2.1 (528), had finished its last update at time T2, for T1 not equal to T2, then there is a high risk of data inconsistency at VG2 (522).

As another example, a gap can exist if the tree structures (layout paths) deriving from different SVs comprised in MRG (520-A) are not identical. Assume, for example that SV2.2 (528) had been removed, causing the trees deriving from SV1 (523) and SV2 (526) to be different from each other. This, typically, indicates the existence of one of two possible implementation problems: (1) If SV2.2 (528) is not critical for the operation of DP environment, then it logically follows that SV1 (523) has one redundant replica which constitutes a waste; or, (2) if SV2.2 (528) is critical than it should be returned or re-created.

Referring to FIG. 5c, there is illustrated a non-limiting example of grouping resources in yet other DP scheme in accordance with certain embodiments of the presently disclosed subject matter.

The illustrated DP scheme comprises four parents: source parent (531) and target parents (532, 533 and 534). The source parent (531) is associated with MRG1 constituted by SV1 (535) and SV2 (539); the $1^{st}$ target parent (532) is associated with MRG2 constituted by storage volumes SV1.1 (536) and SV2.1.1 (541), the $2^{nd}$ target parent (533) is associated with MRG3 constituted by storage volume SV1.1.1 (537), and $3^{rd}$ target parent is associated with MRG4 constituted by storage volumes SV2.1.2 (542) and SV2.1.3 (543). The storage volumes can have several levels of replicas constituting respective layout paths. In accordance with best practice, a target parent should access one replica of each storage volume comprised in MRG1 associated with the source parent, while the said replicas shall have the same layout path (namely, be located on the equivalent places within the replication three). Accordingly, the gap profile can be specified as violation of said best practice.

Matching the illustrated DP scheme to above gap profile results in identifying following gaps:

The $1^{st}$ target parent (532) accesses SV1.1 (536) and SV2.1.1 (541) having different layout paths;

The $2^{nd}$ parent (533) accesses only replica SV 1.1.1 (537) of SV1 and has no access to a replica of SV2. In accordance with best practice this parent should access also replica of SV2 (539).

The $3^{rd}$ parent (534) accesses SV 2.1.2 (542) and SV 2.1.3 (543) which are both replicas of SV 2 (539). In accordance with best practice this parent should access one replica of each volume (e.g. SV 2.1.2 (542) and SV 1.1.2 (538)).

Another example of gap analysis can be illustrated by the further detailing the illustrated DP scheme:

Assume that parent (531) is constituted by Oracle Instance wherein data files are accommodated by SV1 (535) and log files and archives are accommodated by SV2 (539);

SV1.1 (536) and SV2.1 (540) are configured as Clones (i.e., point-in-time copies) of SV1(535) and SV2 (539) respectively;

Assume copy time of the Clones is scheduled according to a common best practice of doing so while the Oracle database is in hot-backup mode.

If the copy time of the clone SV1.1 (536), containing a copy of the data files, is later than the copy time of the Clone SV2.1 (540) containing a copy of the archive and log files, then the set of two Clones might not represent a consistent backup of the Oracle instance, even though it was taken during hot-backup which is a best practice. Accordingly, the gap profile related to the above DP scheme shall comprise comparing the timing of copies with identical layout paths related to different storage volumes within MRG and verifying that the copies containing the database data files are copied before the copies containing the archive and log files.

Figure 6:
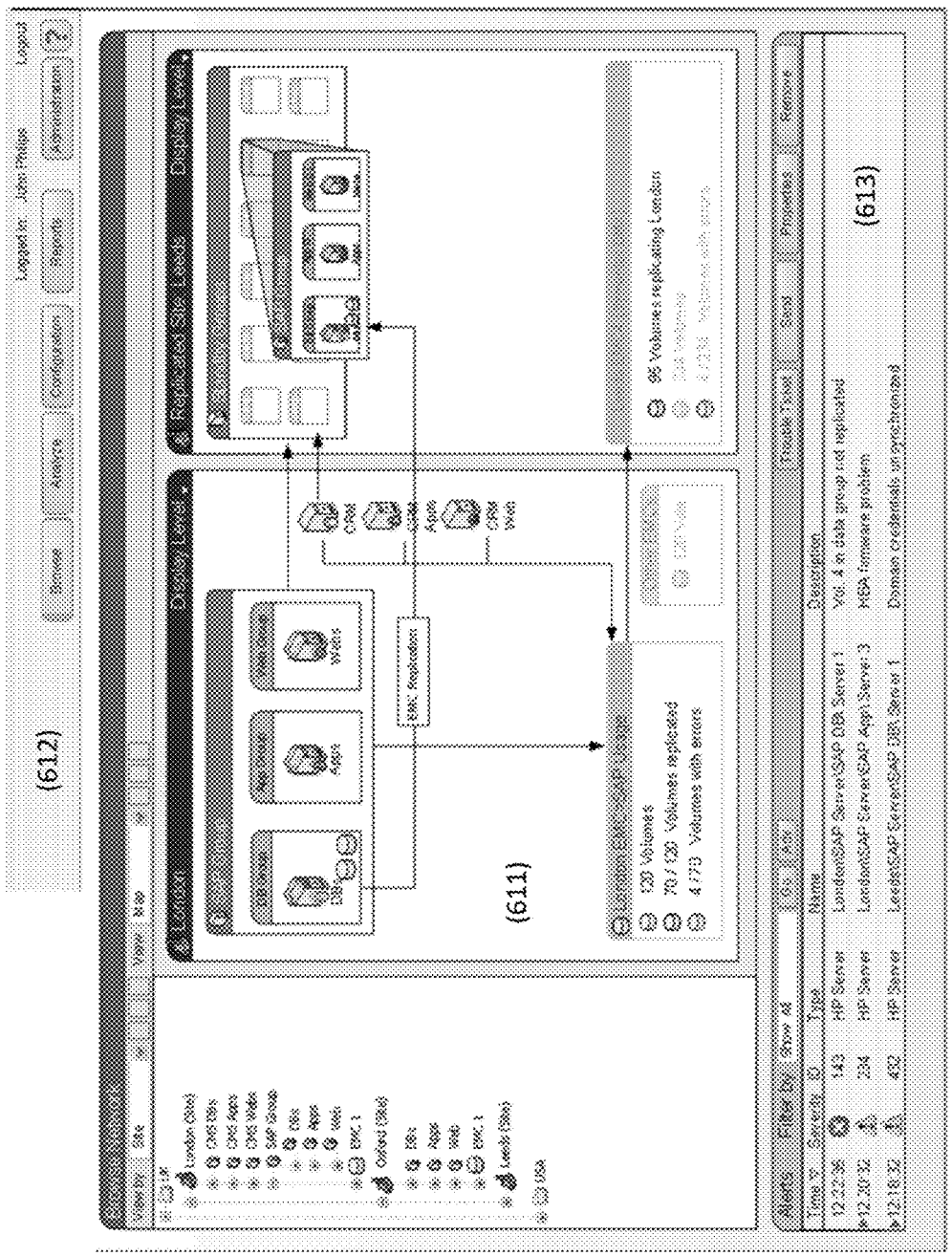
FIG. 6 illustrates a fragment of a sample screen for topology browsing in accordance with certain embodiments of the presently disclosed subject matter.

Attention is drawn to FIG. 6, illustrating an exemplary screenshot of the user interface with topology browser. In accordance with certain embodiments of the presently disclosed subject matter the DP system is configured to generate a representation of the data accommodated in the object repository DB (collected data and results of analysis) in a form of topology map presenting a layout of DP resources.

The user interface can be configured to comprise a topology browser enabling a user to view the topology map and drill-down into the DP layout at a certain point in time and/or over certain period. The topology browser enables to zoom in and out of scope, to reveal certain resources, characteristics, configuration and relationship thereof, to etc. For example, selecting a specific site, application or server via a tree panel (611) provides displaying the selected resource(s) together with dependant standby resources known to the system. It is noted that application is a selectable object characterized by a one or more DP resources running and/or supporting the application. Display level menu (612) enables control of zoom and details level for different hierarchical levels of respective DP resources. The user interface can be also configured to display data accommodated in the event DB (e.g.

alert panel (613)) and associate the presentation of said data with the topology map presentation. For example, selecting alert(s) from the alert panel enables presenting the DP resource(s) related to the alert; and, opposite, selecting DP resource(s) enables presenting alert(s) related to the resource(s).

Figure 7:
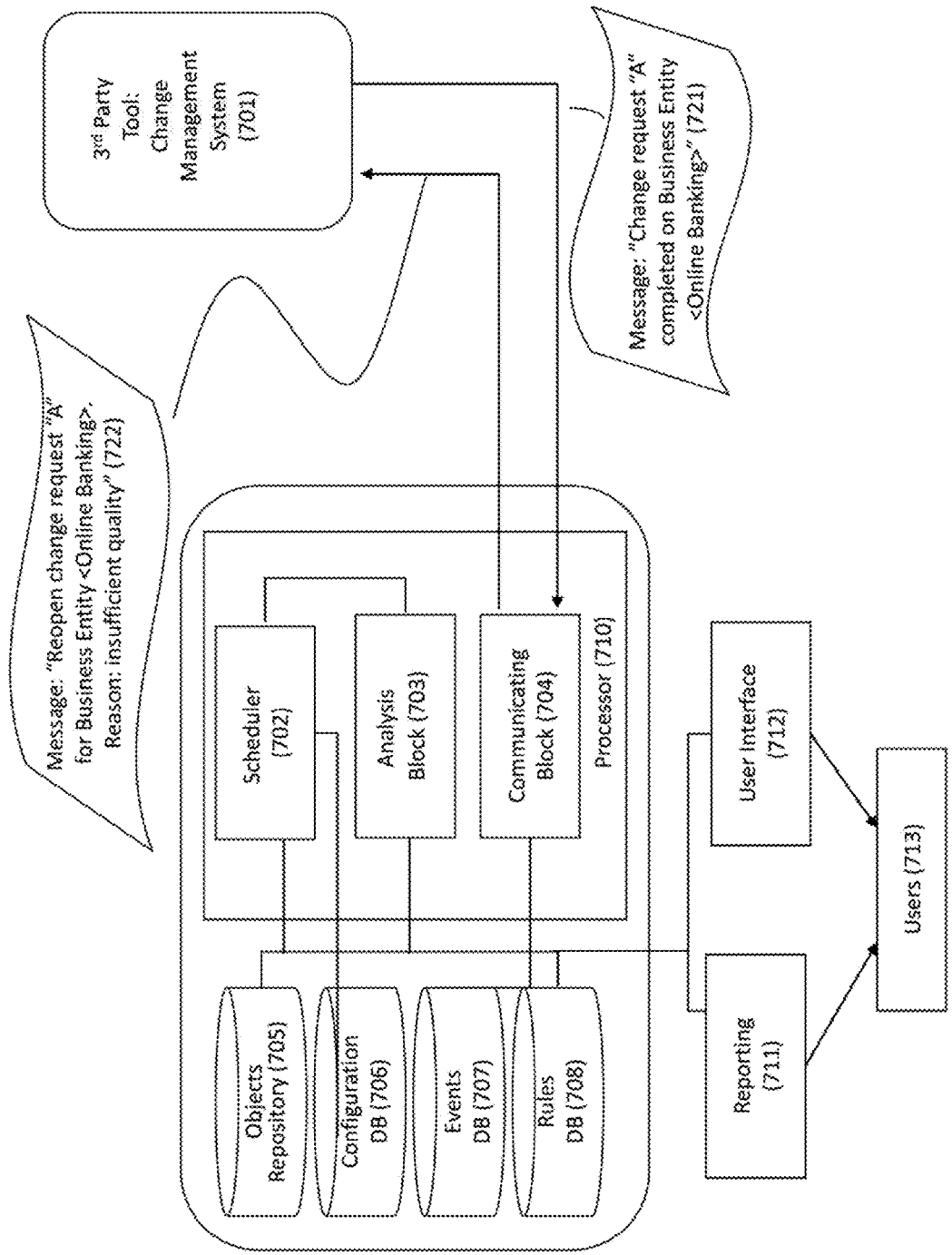
FIG. 7 illustrates an exemplified flow of events and interaction between an external system and the system for managing DP resources in accordance with certain embodiments of the presently disclosed subject matter

Attention is drawn to FIG. 7, illustrating an exemplary flow of events and interactions of the DB system with an external system. In accordance with certain embodiments of the presently disclosed subject matter, the DP system receives a notification (722) from an external (e.g. 3$^{rd}$ party) tool that is used to manage and track changes in IT, that a Business Entity called <Online Banking> has completed a change. The notification (722) is passed through the communication block (704) which generates an appropriate event in the Events DB (707). In turn, the Scheduler (702), which subscribes to such events, triggers an analysis cycle by the Analysis Block (703). The Analysis Block (703) detects new DP gaps, re-calculates relevant DP risk scores of DP resources corresponding to the Business Entity and accommodates the results in the Configuration DB (706). The Analysis Block further uses the updated risk scores for calculating an aggregated risk score of the <Online Banking> Business Entity and compares the calculated aggregated risk score with a previously assessed risk score. If the changes in the aggregated risk score exceed a predefined threshold, the Analysis Block generates a new event indicating a failed changed and stores it into the Events DB (707). The Communication Block (704) processes the new event and notifies (722) the Change Management System (701) that the change request should be re-opened due to insufficient quality. The Users (713) can also receive similar notifications, or perform more detailed investigation more details through the Reporting component (711), and/or the User Interface (712). Said investigation can include review of newly performed changes as well as newly detected risks following the changes, thus enabling the user with root-cause-analysis and actionable information.

The following non-limiting example illustrates the capability of certain embodiments of the presently disclosed subject matter to assess DP risk score to DP resources in different points in time and over time.

A set of changes are performed in a DP resource named <financial system> and including a plurality of DP resources. The set of changes includes, among others, application of patches to multiple cluster nodes within the <financial system>, modification of cluster service group that includes adding a new database instance managed by the cluster, and an addition of hardware I/O controllers. While some of the changes are skillfully applied according to all relevant vendor best practices and common industry experience, the following gaps have been identified:

a. The installation of the patch that was applied successfully to some cluster nodes but failed on at least one—thereby reducing the stability of the cluster;
 b. The new database instance added was configured to communicate over a private cluster "heart-beat" network instead of over a public cluster network—thereby presenting a risk that the cluster would not function correctly which could result in downtime or data loss;
 c. At least one of the new hardware I/O controllers was not configured with appropriate "Queue depth" parameter—thereby dramatically reducing the performance of the cluster and introducing risks of downtime.

The DP system can be configured to generate a report presenting the provided changes and respectively caused DP gaps affecting the DP resource <financial system> and DP resources therein. The report can further present DP resources within <financial system> affected by the identified gaps as well as severity of the identified gaps with regard to the entire <financial system> and the DP resources therein.

In accordance with certain embodiments of the presently disclosed subject matter, the DP system can calculate and accommodate, for each point in time, the risk score being a function of the gaps identified at respective point in time with regard to respective DP resources. Thus, the generated report can further present aggregated risk score assessed to the <financial system> and risk scores assessed of DP resources therein. The report can also present the changes of risk scores resulted from the provided changes and respective identified gaps.

In addition to the root (provided changes)—cause (identified gaps) analyses, the report can comprise recommendations with regard to remediation steps. Referring back to the example above, the recommendations can be "re-install patch on missing nodes" for the identified gap a); recommended configuration and network interface to be used for the identified gap b); recommendation to "Change Queue depth value on adapter X on host Y from A to B" can be provided for the identified gap c), etc.

Those skilled in the art will readily appreciate that, likewise, a user can obtain the report or parts thereof via a user interface capable to present the information above responsive to user's inputs.

Those skilled in the art will, also, readily appreciate that additional, different or more complex flows can be implemented utilizing the notification, analysis and risk detection capabilities of the invention, including the ability of the user, after taking action to fix some of the identified risks, to re-run the analysis in an iterative fashion (optionally, in a test environment), allowing the Users to quickly and effectively return the Business Entity to a ready state.

It is to be understood that the invention is not limited in its application to the details set forth in the description contained herein or illustrated in the drawings. The presently disclosed subject matter is capable of other embodiments and of being practiced and carried out in various ways. The presently disclosed subject matter is applicable in a similar manner for identifying gaps in a data protection design.

It should be noted that the presently disclosed subject matter is not bound by the specific algorithm of processing or specific structure. Those versed in the art will readily appreciate that the presently disclosed subject matter is, likewise, applicable to any other processing or presentation with equivalent and/or modified functionality which can be consolidated or divided in another manner.

It will also be understood that the presently disclosed subject matter further contemplates a machine-readable memory tangibly embodying a program of instructions executable by the machine for executing the method of the presently disclosed subject matter.

Those skilled in the art will readily appreciate that various modifications and changes can be applied to the embodiments of the presently disclosed subject matter as hereinbefore described without departing from its scope, defined in and by the appended claims.

The invention claimed is:

1. A method of computerized managing a plurality of data protection (DP) resources, the method comprising:
 accommodating data related to at least part of the DP resources among said plurality of DP resources in a memory thus giving rise to accommodated data, wherein at least part of the accommodated data is obtained by automated collecting;

processing, by a processor operatively coupled to the memory, the accommodated data, said processing resulting in identifying at least one data protection (DP) scheme characterized, at least, by a data protection technique implemented with regard to at least one DP resource related to said DP scheme;

identifying, by the processor, one or more data protection (DP) gaps affected by the at least one DP resource; and using the identified one or more DP gaps for assessing, by the processor, DP risk score to the at least one DP resource, wherein identifying the one or more DP gaps comprises running at least one rule being characterized by a scope of the rule, an identification condition and an action to be drawn from the rule when the condition is satisfied, wherein the scope of the rule is characterized by said identified DP scheme.

2. A method of computerized managing a plurality of data protection (DP) resources, the method comprising:

accommodating data related to at least part of the DP resources among said plurality of DP resources in a memory thus giving rise to accommodated data, wherein at least part of the accommodated data is obtained by automated collecting;

processing, by a processor operatively coupled to the memory, the accommodated data, said processing resulting in identifying at least one data protection (DP) scheme characterized, at least, by a data protection technique implemented with regard to at least one DP resource related to said DP scheme;

identifying, by the processor, one or more data protection (DP) gaps affected the at least one DP resource; and using the identified one or more DP gaps for assessing, by the processor, DP risk score to the at least one DP resource, wherein at least one DP gap is characterized by a gap profile and is identified by matching said gap profile to a respective DP scheme.

3. The method of claim 2, wherein the gap profile is specified as a combination of the DP scheme and condition characterizing one or more predefined DP violations.

4. The method of claim 1, wherein assessing DP risk score to the at least one DP resource comprises calculating the risk score as a function of, at least, the identified one or more DP gaps, respective DP gaps severities and a state of the at least one DP resource.

5. The method of claim 1, further comprising accommodating in the memory the one or more DP risk scores assessed to the at least one DP resource, each DP risk score associated with a time stamp indicative of point in time of assessing the respective risk score.

6. The method of claim 5, further comprising generating one or more reports rendering, at least, data indicative of differences between DP risk scores assessed to the at least one DP resource and having different time stamps.

7. The method of claim 5, wherein assessing DP risk score is provided responsive to at least one change in the data protection technique implemented with regard to the at least one DP resource, and wherein the generated report renders the provided at least one change in conjunction with DP risk score associated with a time stamp corresponding to the time of the at least one change.

8. A system capable of computerized managing a plurality of data protection (DP) resources, the system comprising:

a memory adapted to accommodate data related to at least part of the DP resources among said plurality of DP resources, wherein at least part of accommodated data is obtained by automated collecting and/or automated processing of the collected data, thus giving rise to accommodated data; and a processor operatively coupled to the memory and configured to process the accommodated data, said processing to be resulted in identifying at least one data protection (DP) scheme characterized, at least, by a data protection technique implemented with regard to at least one DP resource related to said DP scheme and in identifying one or more data protection (DP) gaps affected the at least one DP resource, the processor being further configured to use the identified one or more DP gaps for assessing DP risk score to the at least one DP resource, wherein identifying the one or more DP gaps comprises running at least one rule being characterized by a scope of the rule, an identification condition and an action to be drawn from the rule when the condition is satisfied, wherein the scope of the rule is characterized by said identified DP scheme.

9. The system of claim 8, wherein at least one DP gap is characterized by a gap profile and is identified by matching said gap profile to a respective DP scheme.

10. The system of claim 9, wherein the gap profile is specified as a combination of the DP scheme and condition characterizing one or more predefined DP violations.

11. A system capable of computerized managing a plurality of data protection (DP) resources, the system comprising:

a memory adapted to accommodate data related to at least part of the DP resources among said plurality of DP resources, wherein at least part of accommodated data is obtained by automated collecting and/or automated processing of the collected data, thus giving rise to accommodated data; and a processor operatively coupled to the memory and configured to process the accommodated data, said processing to be resulted in identifying at least one data protection (DP) scheme characterized, at least, by a data protection technique implemented with regard to at least one DP resource related to said DP scheme and in identifying one or more data protection (DP) gaps affected the at least one DP resource, the processor being further configured to use the identified one or more DP gaps for assessing DP risk score to the at least one DP resource, wherein assessing DP risk score to the at least one DP resource comprises calculating the risk score as a function of, at least, the identified one or more DP gaps, respective DP gaps severities and a state of the at least one DP resource.

12. A system capable of computerized managing a plurality of data protection (DP) resources, the system comprising:

a memory adapted to accommodate data related to at least part of the DP resources among said plurality of DP resources, wherein at least part of accommodated data is obtained by automated collecting and/or automated processing of the collected data, thus giving rise to accommodated data; and a processor operatively coupled to the memory and configured to process the accommodated data, said processing to be resulted in identifying at least one data protection (DP) scheme characterized, at least, by a data protection technique implemented with regard to at least one DP resource related to said DP scheme and in identifying one or more data protection (DP) gaps affected the at least one DP resource, the processor being further configured to use the identified one or more DP gaps for assessing DP risk score to the at least one DP resource, wherein the processor is further configured to associate each DP risk score assessed to the at least one DP resource with a time stamp indicative of point in time of assessing corresponding risk score, and the memory is further configured to accommodate the DP risk scores in conjunction with respectively associated time stamps.

13. The system of claim 12, further comprising a report generator configured to generate one or more reports rendering, at least, data indicative of differences between DP risk scores assessed to the at least one DP resource and having different time stamps.

14. The system of claim 13, wherein the processor is configured to assess DP risk score responsive to at least one change in the data protection technique implemented with regard to the at least one DP resource, and wherein the report generator is configured to generate one or more reports rendering the provided at least one change in conjunction with DP risk score associated with a time stamp corresponding to the point in time of the at least one change.

15. A computerized method of providing a service related to identifying one or more data protection (DP) gaps related to one or more DP resources among a plurality of data protection (DP) resources, the service comprising:

accommodating data related to at least part of the DP resources among said plurality of DP resources in a memory thus giving rise to accommodated data, wherein at least part of the accommodated data is obtained by automated collecting;

processing, by a processor operatively coupled to the memory, the accommodated data, said processing resulting in identifying at least one data protection (DP) scheme characterized, at least, by a data protection technique implemented with regard to at least one DP resource related to said DP scheme;

identifying, by the processor, one or more data protection (DP) gaps affected the at least one DP resource; and using the identified one or more DP gaps for assessing, by the processor, DP risk score to the at least one DP resource, wherein identifying the one or more DP gaps comprises running at least one rule being characterized by a scope of the rule, an identification condition and an action to be drawn from the rule when the condition is satisfied, wherein the scope of the rule is characterized by said identified DP scheme.

16. The method of claim 15, wherein assessing DP risk score to the at least one DP resource comprises calculating the risk score as a function of, at least, the identified one or more DP gaps, respective DP gaps severities and a state of the at least one DP resource.

17. A computerized method of providing a service related to identifying one or more data protection (DP) gaps related to one or more DP resources among a plurality of data protection (DP) resources, the service comprising:

accommodating data related to at least part of the DP resources among said plurality of DP resources in a memory thus giving rise to accommodated data, wherein at least part of the accommodated data is obtained by automated collecting;

processing, by a processor operatively coupled to the memory, the accommodated data, said processing resulting in identifying at least one data protection (DP) scheme characterized, at least, by a data protection technique implemented with regard to at least one DP resource related to said DP scheme;

identifying, by the processor, one or more data protection (DP) gaps affected the at least one DP resource;

using the identified one or more DPI gaps for assessing, by the processor, DPI risk score to the at least one DP resource;

accommodating in the memory one or more DP risk scores assessed to the at least one DP resource, each DP risk score associated with a time stamp indicative of point in time of assessing the respective DP risk score; and generating one or more reports rendering, at least, data indicative of differences between DP risk scores assessed to the at least one DP resource and having different time stamps.

* * * * *